United States Patent
Liu et al.

(10) Patent No.: US 10,652,064 B2
(45) Date of Patent: May 12, 2020

(54) TECHNIQUES FOR COMMUNICATING SYNCHRONIZATION SIGNAL TIMING INFORMATION

(71) Applicant: ZTE Corporation, Shenzhen, Guangdong (CN)

(72) Inventors: Xing Liu, Guangdong (CN); Peng Hao, Guangdong (CN); Ting Miao, Guangdong (CN); Haigang He, Guangdong (CN); Feng Bi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 35 days.

(21) Appl. No.: 16/168,820

(22) Filed: Oct. 23, 2018

(65) Prior Publication Data

US 2019/0058620 A1 Feb. 21, 2019

Related U.S. Application Data

(63) Continuation of application No. PCT/CN2017/083344, filed on May 5, 2017.

(51) Int. Cl.
*H04L 27/26* (2006.01)
*H04L 27/06* (2006.01)
(Continued)

(52) U.S. Cl.
CPC ........ *H04L 27/2613* (2013.01); *H04L 5/0053* (2013.01); *H04L 27/06* (2013.01);
(Continued)

(58) Field of Classification Search
CPC ... H04L 27/2613; H04L 5/0053; H04L 27/06; H04W 56/002; H04W 48/12; H04W 48/16

See application file for complete search history.

(56) References Cited

U.S. PATENT DOCUMENTS

| 10,484,153 B2 * | 11/2019 | Si ..................... H04L 5/0051 |
| 2013/0229953 A1 * | 9/2013 | Nam ................. H04W 72/0426 370/280 |

(Continued)

FOREIGN PATENT DOCUMENTS

| CN | 103906139 A | 7/2014 |
| CN | 104956728 A | 9/2015 |

(Continued)

OTHER PUBLICATIONS

Extended European Search Report dated Jun. 4, 2019 for European Application No. 17908237.5, filed on May 5, 2017 (11 pages).

(Continued)

*Primary Examiner* — Brian D Nguyen
(74) *Attorney, Agent, or Firm* — Perkins Coie LLP

(57) ABSTRACT

The described technology can be implemented as a wireless communication method in which timing information in a wireless communication network is mapped to a signal. The timing information includes information related to a synchronization signal block index and the signal includes at least one of a reference signal on a broadcast channel and a synchronization signal. The signal is transmitted by including at least a part of the information related to the synchronization signal block index.

16 Claims, 14 Drawing Sheets

(51) Int. Cl.
*H04L 5/00* (2006.01)
*H04W 56/00* (2009.01)
*H04W 48/12* (2009.01)
*H04W 48/16* (2009.01)

(52) U.S. Cl.
CPC ......... *H04W 48/12* (2013.01); *H04W 56/002* (2013.01); *H04W 48/16* (2013.01)

(56) References Cited

U.S. PATENT DOCUMENTS

| | | | | |
|---|---|---|---|---|
| 2015/0016239 | A1* | 1/2015 | Yi | H04J 11/003 370/201 |
| 2015/0358124 | A1* | 12/2015 | Suzuki | H04L 1/1861 370/329 |
| 2016/0073383 | A1* | 3/2016 | Han | H04W 72/042 370/329 |
| 2017/0111886 | A1* | 4/2017 | Kim | H04W 72/042 |
| 2018/0242324 | A1* | 8/2018 | Luo | H04L 5/005 |
| 2018/0279388 | A1* | 9/2018 | Miao | H04W 76/10 |
| 2018/0302843 | A1* | 10/2018 | Frenger | H04W 48/10 |
| 2018/0324023 | A1* | 11/2018 | Zeng | H04J 13/0003 |
| 2019/0165983 | A1* | 5/2019 | Nakayama | H04B 7/0413 |
| 2019/0387441 | A1* | 12/2019 | Koskela | H04W 36/0072 |

FOREIGN PATENT DOCUMENTS

| | | |
|---|---|---|
| CN | 105409289 A | 3/2016 |
| WO | 2016/210302 A1 | 12/2016 |
| WO | 2018/156300 A1 | 8/2018 |
| WO | 2018/191006 A1 | 10/2018 |
| WO | 2018/191655 A1 | 10/2018 |

OTHER PUBLICATIONS

Huawei, et al., "Discussion on SS burst set composition and SS block time index indication," 3GPP TSG RAN WG1 Meeting #88, R1-1703353, Athens, Greece, 7 pages, Feb. 2017.

ZTE, "On SS block time index-indication," 3GPP TSG RAN WG1, Meeting #89, R1-1707044, Hangzhou, China, 6 pages, May 2017.

International Search Report and Written Opinion dated Jan. 25, 2018 for International Application No. PCT/CN2017/083344, filed on May 5, 2017 (11 pages).

* cited by examiner

TECHNIQUES FOR COMMUNICATING SYNCHRONIZATION SIGNAL TIMING INFORMATION

CROSS REFERENCE TO RELATED APPLICATIONS

This patent document is a continuation of and claims priority to International Patent Application No. PCT/CN2017/083344, filed on May 5, 2017. The entire content of the before-mentioned patent application is incorporated by reference as part of the disclosure of this document.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. For better bandwidth utilizations, techniques such as the use of multiple antennas for transmission and/or reception are also being used.

SUMMARY

This document describes technologies, among other things, for communicating and using timing information related to a wireless communications network.

In one example aspect, a method of wireless communications includes mapping timing information in a wireless communication network to a signal, wherein the timing information includes information related to a synchronization signal (SS) block index and the signal comprises a reference signal on a broadcast channel, and/or a synchronization signal, and transmitting the signal to include at least a part of the information related to the SS block index.

In another example aspect, a method of wireless communications includes receiving, by a receiving device, a signal comprising a mapping of timing information in a wireless communication network, wherein the timing information includes information related to a synchronization signal (SS) block index and the signal comprises a reference signal on a broadcast channel, and/or a synchronization signal, and recovering at least a part of the SS block index from the signal.

In yet another example aspect, a wireless communications apparatus comprising a memory, and a processor is disclosed. The memory is configured to store processor-executable code. The processor is configured to read the code and implement a method described herein.

In another example aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
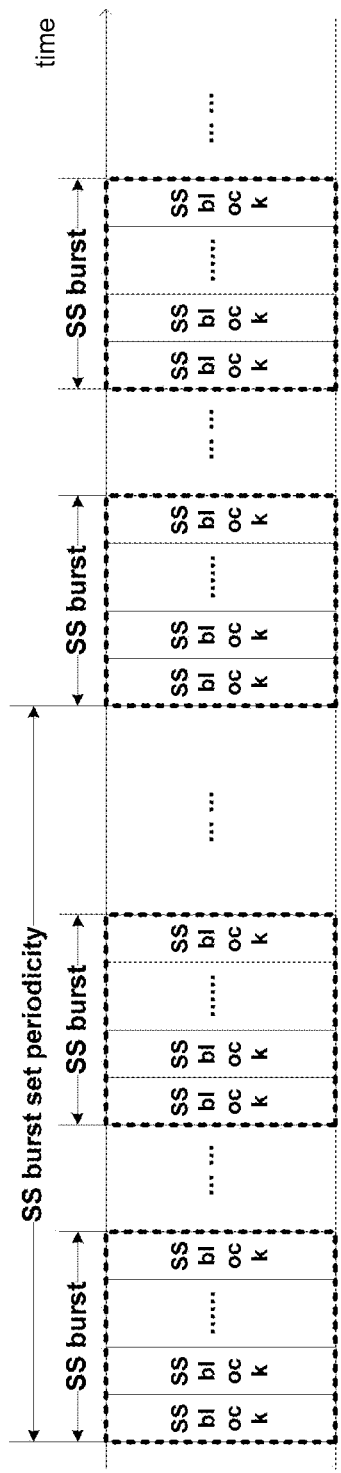
FIG. 1 shows an example of a sequence of signal transmissions.

Due to continuous progress in radio technology, a wide range of wireless applications are emerging, leading to a growth in wireless deployments. However, traditional technologies are falling short of meeting such an increased demand on bandwidth. For example, some traditional commercial communications typically offer a maximum bandwidth of 300 MHz, which may not be sufficient to meet the ever-increasing bandwidth demands. The scarcity of the frequency spectrum is one problem that should be addressed by new wireless communications technologies.

It has been proposed that some implementations of the next generation wireless communications may use higher frequency bands. For example, wireless communications may be carried out using a carrier frequency that is higher than the carrier frequency used by the fourth generation (4G) communication system. Some example spectrum bands available for such communications may be in the range of 28 GHz, 45 GHz, 70 GHz, etc. Signals transmitted at such high frequencies experience significant free air propagation loss, e.g., due to absorption by substances present in the air, such as the atmospheric oxygen, rain water, etc. Such loss adversely impacts the high-frequency communications system coverage performance. However, since the carrier frequency corresponding to the high frequency communication has a shorter wavelength, it is possible to ensure that more antenna elements can be accommodated per unit area, and a proper use of more antenna elements enables beamforming by such antenna elements to improve the antenna gain, which, in turn, can increase the number of bits per Hertz per second that can be communicated in the network.

As an illustrative example, the next generation 3GPP uses a mechanism called Synchronization Signal (SS) block for facilitating the multi-antenna communication. An SS block may be defined as a time unit which carries the primary synchronization sequence (PSS), the secondary synchronization sequence (SSS) and/or physical broadcast channel (PBCH) corresponding to one or a set of beam(s) between a transmitter and a receiver. Multiplexing other signals (such as, beam-related reference signal (RS), paging, data transmission) are not precluded within an SS block. An SS burst may include one or more consecutive resources for nominal SS block(s) transmission. An SS burst set with a fixed periodicity can include one or more SS bursts. There is one beam duty cycle in one SS burst set. A single set of possible SS block time positions is specified per frequency band.

In the current version of the standard, the maximum number of SS-blocks, L, within SS burst set for different frequency ranges are as follows.

For a frequency range up to 3 GHz, the maximum number of SS-blocks, L, within SS burst set is [1, 2, 4].

For a frequency range from 3 GHz to 6 GHz, the maximum number of SS-blocks, L, within SS burst set is [4, 8].

For a frequency range from 6 GHz to 52.6 GHz, the maximum number of SS-blocks, L, within SS burst set is [64].

The current standard discussion suggests using the physical broadcast channel PBCH to indicate the timing information described above. Among them, implicit indication by PBCH is a potential way to implicit the index information of the SS block in different SS blocks by different PBCH processing methods (for example, cyclic shifts, scrambling code, Cyclic Redundancy Check (CRC) mask, redundancy version of the broadcast channel).

In the high frequency band, it may be desirable to consider supporting up to 64 or more SS blocks. However, supporting for such a large number of SS blocks can create some technical challenges. For example, it may be difficult or impossible to rely solely on the PBCH to implicitly carry the large amount of index information in the large number of SS blocks. In this regard, consider a PBCH which is typically 40-bit long, there are possibly only 40 unique cyclic shifts (1 bit shift interval). This number cannot meet the requirements of 64 or more different SS block index. For another example on the other hand, this scheme of supporting such a large number of SS blocks will bring a huge overhead for blindly decoding the PBCH to the mobile terminal, which may need to try 64 or more different configurations to decode PBCH.

The are no existing solutions in the current standard on how to reduce the overhead of the above methods, and how to reduce the capacity requirements of the instructions in a next generation system such as the New Radio (NR) specification.

The technology disclosed in this patent document can be implemented to address the above technical challenges in the NR technology and includes techniques for transmitting timing information in a new generation communication system, and corresponding techniques for receiving the information. Some embodiments of the disclosed technology may implement features comprising: using a signal to carry at least part of the synchronization signal block index related information. The signal may comprise a demodulation reference signal (DMRS) of the physical broadcast channel, and/or a synchronization signal.

Based on the beamforming, a transmitter can concentrate its emission energy in a certain direction, while in other directions the energy is small or absent, that is, each beam has its own directivity, and each beam can only cover to a terminal in a certain direction. Therefore, a base station may use a transmitter that can operate with beams in various different directions, e.g., dozens or even hundreds of directions, to complete the full range of coverage within a cell. Some embodiments may be programmed to perform the measurement and recognition of the preliminary beam direction during the initial access of the network and to focus the base station side transmitting beam for a time interval for the terminal to identify the preferred beam or port.

Specifically, as shown in an example in FIG. 1, a SS burst set structure is used to transmit a synchronization signal, a sweeping resource of a physical broadcast channel, wherein the SS burst set contains one or more synchronization signal bursts (SS bursts). One SS burst contains one or more synchronization signal block (SS blocks), each SS block carrying a specific beam/port (group) of the synchronization signal. An SS burst set may be used to enable a complete a beam scan, that is, all the beam/port available for transmission. Among them, the synchronization signal block may include other signals such as the physical broadcast channel PBCH, the PBCH corresponding demodulation reference signal, other control channels, data channels, and the like. Where a plurality of SS blocks are mapped into the same subframe, the offset of the different SS blocks relative to the subframe boundary is different, and the terminals at different positions may successfully detect the synchronization signal in any one of the SS blocks. In order to complete the subframe timing, the terminal should to know the time zone information that is currently synchronized to the SS block.

In various embodiments of the disclosed technology, the synchronization signal block index related information may include at least one of the following: (1) the SS burst set number of the synchronization signal window group, (2) the SS burst set number of the synchronization signal window within the SS burst set, (3) the slot number in the SS burst, (4) the SS block number in the slot, (5) the SS block number in the burst set, (6) the SS block number in the SS burst, (7) the slot number in the SS burst set, (8) N least significant bits (N LSBs) of the SS block index, (9) M most significant bits (M MSBs) of the SS block index, (10) X middle significant bits of SS block index, where N, M and X are non-negative integers.

In various embodiments, at least one of the following DMRS features indicates the synchronization signal block index related information: (1) a DMRS sequence, (2) a scrambling code of the DMRS sequence, (3) the order of the DMRS sequences for a plurality of data symbols, (4) the time domain position of the DMRS, and (5) the frequency domain position of the DMRS.

In some embodiments, the synchronization signal block index correlation information is indicated by a synchronization signal, and at least one of the following synchronization signal characteristics is used to indicate the synchronization signal block index related information: (1) a sequence of a synchronization signal, (2) the scrambling sequence of the first-order synchronization signal, (3) the combination of the multi-level synchronization signal scrambling sequence, (4) the synchronization signal sequence and (5) the synchronization signal sequence scrambling sequence.

In some embodiments, the signal may indicate a complete synchronization signal index with a combination of physical broadcast channel transmission modes.

In some embodiments, physical broadcast channel transmission can include at least one of the following items: (1) the information bits carried by the physical broadcast channel, (2) the cyclic shift of the physical broadcast channel information bits, (3) the scrambling code of the physical broadcast channel, and (4) the CRC mask of the physical broadcast channel, (5) the redundancy version (RV) of the physical broadcast channel.

In some embodiments, the mapping relationship between the timing information and the signal and/or the physical broadcast channel transmission mode may be bound to the cell ID.

Various example embodiments are disclosed herein.

Example Embodiment 1

This embodiment describes the use of the PBCH DMRS sequence to indicate SS block index information.

Figure 2:
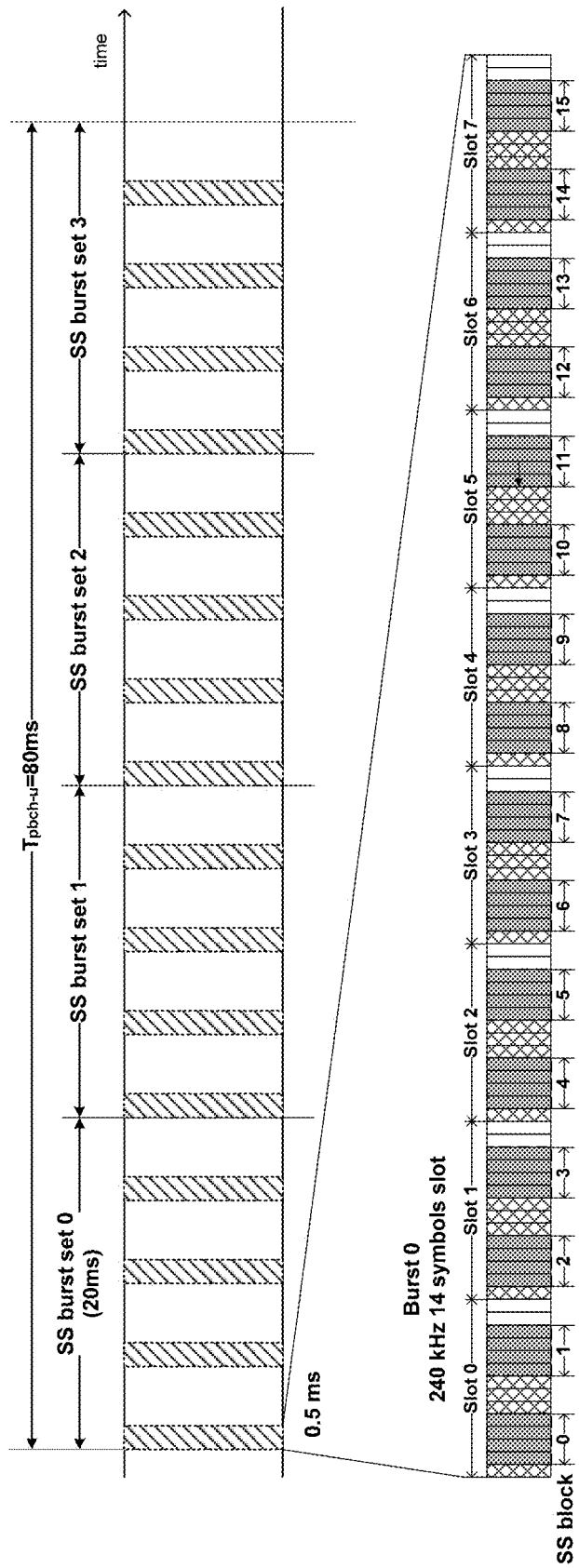
FIG. 2 shows an example transmission signal format.

In the structure shown in FIG. 2, PBCH TTI=80 ms, contains four SS burst sets of 20 ms cycles. Each SS burst set contains four SS bursts, each SS burst evenly distributed within the SS burst set. Thus, every 5 ms configure an SS burst with duration of 0.5 ms is present. An example SS burst internal structure, that is, mapping structure from SS blocks to the data transmission slots, "240 kHz 14 symbols time slot" is illustrated herein, as an example in the figure and description given further. This contains up to 64 SS blocks in the SS burst set. The mapping of the SS blocks to the data transmission slots and the number of SS blocks included in the SS burst set are only examples. Other number of SS blocks may also be used. Furthermore, for different frequency bands, the number of SS blocks, the subcarrier spacing of the signal channels within the SS block, and the time domain mapping structure from SS blocks to the slots may also be different. In addition, the 64 resources are the potential transmission resources for the SS block. In the actual system, the base station may choose to carry the SS block on some or all of the resources. When some resources are not actually sent SS block, the corresponding index will also be reserved, will not affect the index of other SS block, that is, SS block index and the corresponding time domain position of the index is fixed.

Some examples of how the base station indicates to the terminal the 64 SS block index {SS block index 0~63} are given herein.

In particular, in this example embodiment, the PBCH DMRS maps to the time-frequency resources fixed within each SS block, e.g., the DMRS sequence length, e.g., the inserted time-frequency domain interval to meet the PBCH demodulation performance requirements, only by different sequences distinguish different SS blocks. In the structure shown in FIG. 2, there are 64 different SS blocks in the SS burst set. Therefore, 64 different DMRS sequences (such as sequence 0 to sequence 63) can be defined. The DMRS sequence can be a pseudo-random sequence PN sequence (e.g., M sequence). The different SS blocks carry different PBCH DMRS sequences. The mapping between the DMRS sequence and the SS block index may be predefined. For example, the DMRS sequence 0 (S0) corresponds to SS block index 0 (SBI0), sequence 1 and SS block Index 1 corresponds, etc., that satisfies the $S_n \Longleftrightarrow SBI_n$ rule.

In addition, in order to achieve inter-cell interference randomization, the whole system can also define multiple groups of the above mapping relationship, and each group mapping relationship is bound to the cell ID, as shown in the Table 1 to define three sets of mapping relationship.

In the example, the cell ID is determined by the primary and secondary synchronization signal. For example, the primary synchronization signal sequence contains three root sequences, corresponding to the group ID1, the secondary synchronization signal sequence contains 1000 sequences, corresponding to the intra-group ID2, such that cell ID=intra-group ID2*3+group ID1. The total number of cell IDs is 3000. For example, if the group ID is 0 by the primary synchronization identification and the intra-group ID is 500 by the secondary synchronization sequence identification, the cell ID is set to 1500. In this example embodiment, the cell ID value is taken modulo 3, the result is 0, 1, 2, respectively, corresponding to the three predefined SS block index and DMRS sequence mapping rules, which is equivalent to cell ID divided into three groups.

TABLE 1

| Cell ID | SS block index and DMRS sequence mapping rules (n, m is a nonnegative integer) |
|---|---|
| Cell ID mod 3 = 0 | $SBI_n \Longleftrightarrow S_n$ |
| Cell ID mod 3 = 1 | $SBI_n \Longleftrightarrow S_{(63-n)}$ |
| Cell ID mod 3 = 2 | $\begin{cases} SBI_n = S_{(n+m)} & 0 \leq n \leq 63 - m \\ SBI_n = S_{(n+m-64)} & 63 - m < n \leq 63 \end{cases}$ |

A terminal first determines the cell ID by detecting the synchronization signal (including the primary and secondary synchronization signals) of the cell and obtains the mapping rule between the SBI and the DMRS sequence corresponding to the cell ID, further detects the DMRS sequence on the predefined fixed DMRS mapping resource, The DMRS sequence carried in the current SS block determines the SBI in conjunction with the mapping between the DMRS sequence and the current cell SBI and the DMRS sequence.

In the present embodiment, the same group of DMRS sequences is defined by different cells, and the mapping rules of the current cells are determined by binding the cell ID and the mapping rule. It is also possible to define multiple sets of DMRS sequences, for example, to divide the cells into three groups (which can still use the Cell ID mod 3 as described above). Each group corresponds to a different set of DMRS sequences and identifies the cell ID by identifying the current set of DMRS sequences carried by the cell. For example, different groups of cells using the same SS block may select mutually orthogonal sequences as the respective PBCH DMRS, so that due to the orthogonality of the code domain, will avoid different groups of PBCH DMRS mutual interference, improve DMRS sequence identification, and the use of DMRS performs channel estimation performance.

Example Embodiment 2

This embodiment describes the use of PBCH DMRS sequence combinations to indicate SS block index information.

In the structure shown in FIG. 2, PBCH TTI=80 ms, contains four SS burst sets of 20 ms cycles, each SS burst set contains four SS bursts, each SS burst evenly distributed within the SS burst set, that is, every 5 ms, and an SS burst with a duration of 0.5 ms. SS burst internal structure, that is, mapping structure from SS blocks to the data transmission slots, (e.g., "240 kHz 14 symbols time slot") as an example in the figure is given further. This contains up to 64 SS blocks in the SS burst set. The mapping from SS blocks to the data transmission slots and the number of SS blocks included in the SS burst set are only examples. Other possibilities of number SS blocks are not excluded. For different frequency bands, the number of SS blocks, the subcarrier spacing of the signal channels within the SS block, and the time domain mapping structure from SS blocks to the slots may also be different.

Figure 3:
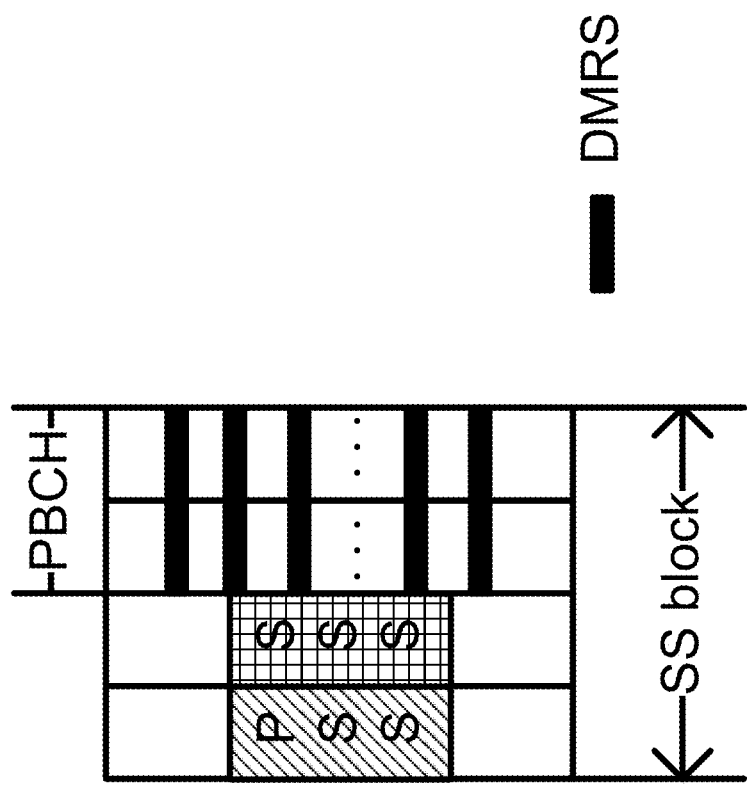
FIG. 3 shows an example of mapping of a reference signal to transmission times.

In this embodiment, PBCH DMRS is mapped on more than one symbol in each SS block. As shown in FIG. 3, DMRS is mapped to two PBCH symbols, respectively, and one symbol is mapped on each symbol DMRS sequence. The DMRS sequence mapped on the first PBCH symbol can be labeled as DMRS1, while the DMRS sequence mapped on the second PBCH symbol is DMRS2, and the SS block index information is indicated by a combination of two DMRS sequences. On each symbol, the frequency domain resources that map DMRS are fixed. In the structure shown in FIG. 2, there are 64 different SS blocks in the SS burst set. Therefore, DMRS1 and DMRS2 should define 8 DMRS sequences respectively. The DMRS sequence can be a pseudo-random sequence PN sequence (such as M sequence, etc.) The DMRS sequences may be the same or different. The different SS blocks carry a combination of different PBCH DMRS1 and DMRS2 sequences. The mapping between the DMRS sequence and the SS block index is predefined, as shown in the example in Table 2, where the DMRS sequence on the two symbols belongs to the same set {S0, S1, . . . , S7}, and SS block index 0 (SBI0) are mapped as shown in Table 2. The mapping relationship is predefined for the system and is not limited to the mapping relationships listed in Table 2.

TABLE 2

| SS block index (SBI) | DMRS1 | DMRS2 |
|---|---|---|
| 0 | S0 | S0 |
| 1 | S0 | S1 |
| 2 | S0 | S2 |
| 3 | S0 | S3 |
| 4 | S0 | S4 |
| 5 | S0 | S5 |
| 6 | S0 | S6 |
| 7 | S0 | S7 |
| 8 | S1 | S1 |
| 9 | S1 | S2 |
| 10 | S1 | S3 |
| ... | ... | ... |
| 56 | S7 | S0 |
| 57 | S7 | S1 |
| 58 | S7 | S2 |
| 59 | S7 | S3 |
| 60 | S7 | S4 |
| 61 | S7 | S5 |
| 62 | S7 | S6 |
| 63 | S7 | S7 |

In order to achieve randomization of inter-cell interference, the entire system may define multiple sets of mapping relationships as described above, and each set of mapping relationships is bound to the cell ID, as shown in Table 3. A terminal first determines the cell ID by detecting the synchronization signal of the cell (including the primary and secondary synchronization signals) and obtains the mapping rule between the SBI and the DMRS sequence corresponding to the cell ID, and further detects DMRS1 and DMRS2 on the predefined fixed DMRS mapping resource, determines the combination of DMRS sequences carried in the current SS block, and combine the DMRS sequences 1, 2, and the mapping between the current cell SBI and the DMRS sequence to determine the SBI. For example, when the terminal detects the cell synchronization signal and determines that the Cell ID is 468, it can verify that 468 mod 3=0, and therefore the SS block index and the DMRS sequence combination mapping rule are "mapping rule 1." Assuming that the mapping rule 1 is the mapping mode shown in Table 2, the terminal detects DMRS1 and DMRS2 on the two symbols where the PBCH is located, determines that DMRS1 is S7, and DMRS2 is S1, thus determining SBI=57.

TABLE 3

| ID | SS block index vs DMRS sequence combination mapping rules |
|---|---|
| Cell ID mod 3 = 0 | Mapping rule 1 |
| Cell ID mod 3 = 1 | Mapping rule 2 |
| Cell ID mod 3 = 2 | Mapping rule 3 |

Example Embodiment 3

This embodiment describes the use of the PBCH DMRS time domain position to indicate part of the SS block index information.

Figure 4:
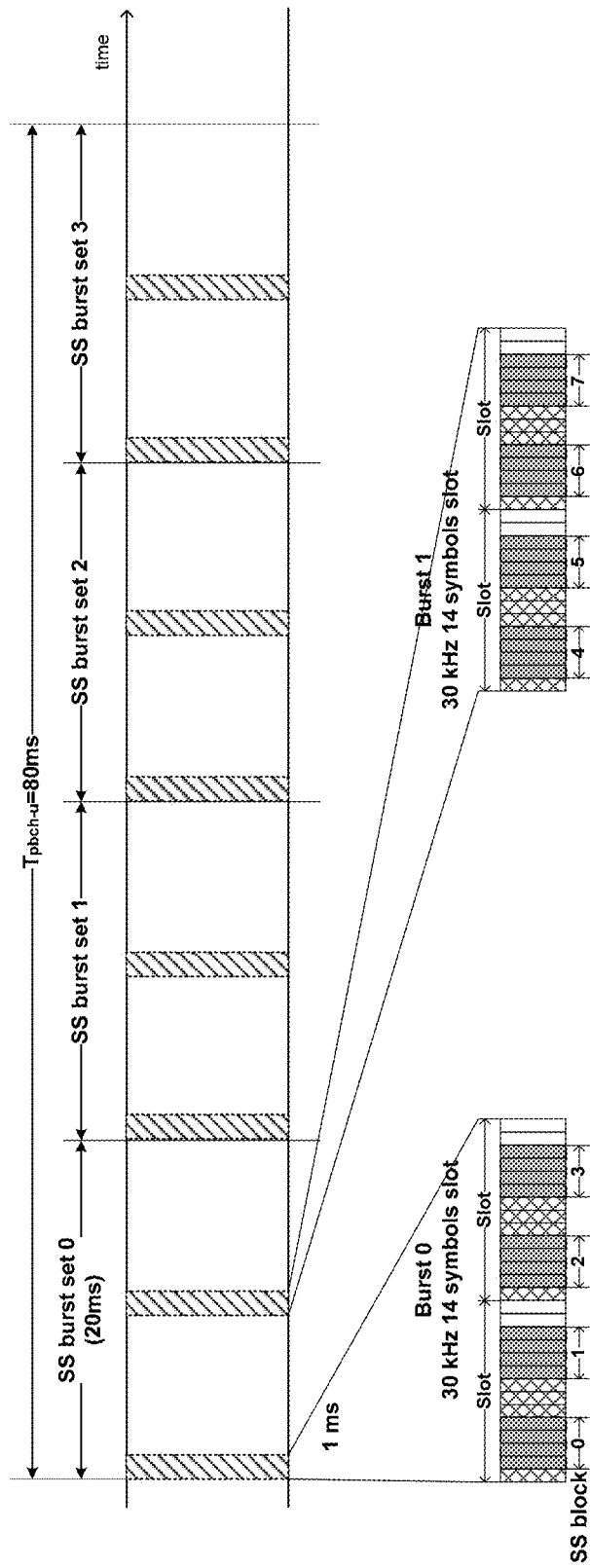
FIG. 4 shows an example of a transmission burst structure.

In the structure shown in FIG. 4, the PBCH TTI=80 ms contains four SS burst sets of 20 ms cycles. Each SS burst set contains four SS bursts. Each SS burst is evenly distributed within the SS burst set, with an SS burst having a duration of 1 ms. FIG. 4 also depicts an example of an SS burst internal structure, that is, SS block to the data transmission Slot mapping, "30 kHz 14 symbol time slot". This example contains up to 8 SS blocks in the SS burst set. The specific mappings and numbers are for illustrative purpose only, and other numbers may be used. For different frequency bands, the number of SS blocks, the subcarrier spacing of the signal channels within the SS block, and the time domain mapping structure from SS blocks to the slots may also be different.

The scenario described below considers how the base station indicates the eight SS block indexes to the terminal.

Specifically, in the present example, each SS block contains more than one PBCH symbol (described as an example of the two-symbol PBCH shown in FIG. 3); the time domain position mapped by the PBCH DMRS, i.e., the penultimate symbol or the last symbol indicates which SS burst within the SS burst set is the current SS block. For example, when the DMRS is mapped to the previous PBCH symbol, it indicates that the current SS block belongs to the first SS burst within the SS burst set. When the DMRS is mapped on the latter PBCH symbol, it indicates that the current SS block belongs to the second SS burst within the SS burst set. Within each PBCH symbol, the DMRS maps to which frequency domain resources (such as which REs), and the DMRS sequence is fixed.

In order to achieve randomization of inter-cell interference, the entire system may define multiple sets of mapping relationships as described above, and each set of mapping relationships is bound to the cell ID, as shown in Table 4. The terminal first determines the cell ID by detecting the synchronization signal of the cell (including the primary and secondary synchronization signals) and obtains the mapping rule between the SBI and the DMRS time domain position corresponding to the cell ID.

TABLE 4

| ID | Relative position of SS burst within the SS burst set | DMRS time domain position |
|---|---|---|
| Cell ID mod 2 = 0 | Previous | PBCH first symbol |
|  | last one | PBCH second symbol |
| Cell ID mod 2 = 1 | Previous | PBCH second symbol |
|  | last one | PBCH first symbol |

Example Embodiment 4

The terminal first detects the synchronization signal of the cell and determines the two symbols of the PBCH based on the fixed relative positional relationship between the synchronization signal and the PBCH symbol and tries to use the DMRS sequence to correlate with the data on the DMRS frequency domain position in the two symbols to determine the time domain position of the PBCH DMRS mapping of the current SS block, and to determine which SS burst within the SS burst set belongs to the current SS block in combination with the mapping rules between the current cell SBI and the DMRS time domain position.

In this embodiment, the partial SS block index is indicated by the PBCH DMRS time domain position, where the partial SS block index information is specifically the SS burst number within the SS burst set. It is also possible to use the PBCH DMRS time domain position to indicate other SS block index information, for example, the synchronization signal window group SS burst set number, slot number within SS burst, SS block number within slot, SS block in SS burst set Number, SS block number in SS burst, slot number in SS burst set.

This embodiment describes the use of the PBCH DMRS frequency domain position to indicate partial SS block index information.

As previously described, in the structure shown in FIG. 4, the PBCH TTI=80 ms contains four burst bursts of 20 ms cycles. Each SS burst set contains four SS bursts.

The scenario below considers how the base station indicates the eight SS block indexes to the user device.

Figure 5:
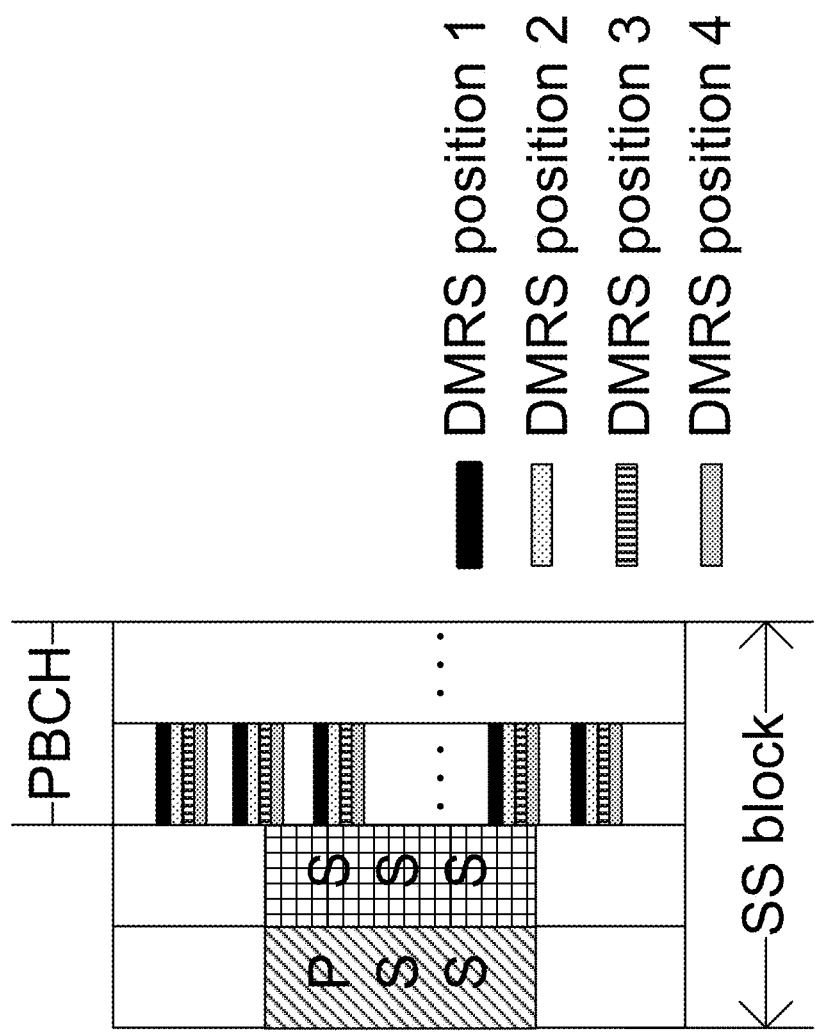
FIG. 5 shows an example mapping of a referee signal transmission to symbols.

Specifically, in the present embodiment, as shown in FIG. 5, the PBCH DMRS is mapped to the first PBCH symbol of each SS block as an example, and the frequency domain position of the PBCH DMRS map, i.e., the different DMRS frequency position 1, 2, 3, 4 to indicate the number of the current SS block within the SS burst, or the relative position of the SS block within the SS burst, as shown in Table 4. Similar to Example 3, in order to achieve randomization of inter-cell interference, the entire system can also define multiple sets of the above mapping relationships, and each set of mapping relationships is bound to the cell ID. The terminal first determines the cell ID by detecting the synchronization signal (including the primary and secondary synchronization signals) of the cell and obtains the mapping rule between the SBI and the DMRS frequency domain position corresponding to the cell ID.

TABLE 5

| SBI | DMRS position |
| --- | --- |
| 0 | 1 |
| 1 | 2 |
| 2 | 3 |
| 3 | 4 |
| 4 | 1 |
| 5 | 2 |
| 6 | 3 |
| 7 | 4 |

In FIG. 5, each DMRS position contains a set of DMRS frequency domain resources (e.g., several REs). Each group of frequency domain resources is predefined by the system, and the base station selects one of the positions to transmit the DMRS sequence. In this embodiment, it is assumed that the sequence of DMRS is fixed.

The terminal first detects the synchronization signal of the cell and determines the two symbols of the PBCH based on the fixed relative positional relationship between the synchronization signal and the PBCH symbol and tries to use the DMRS sequence correlated with received signal in the DMRS sequence position of the first PBCH symbol. The DMRS position of the maximum correlation peak is considered to be the frequency domain position mapped by the current DMRS. The terminal then determines the current SS block belongs to the relative position within the SS burst. For example, if the current terminal determines that the DMRS position is position1, it is possible to determine that the current SS block is the first SS block within the SS burst. This determination does not distinguish between the current SS burst is which one of the SS burst sets, this information can be considered by other instructions (e.g., from higher layer communication) to achieve the SS block index complete information instructions.

In the present embodiment, the partial SS block index is indicated by the PBCH DMRS frequency domain position, where the partial SS block index information is specifically the SS block number/relative position within the SS burst. It is also possible to use the PBCH DMRS frequency domain position to indicate other SS block index information, for example, the synchronization signal window group SS burst set number, the SS burst number in the SS burst set, the slot number in the SS burst, the SS block in the slot number, the SS block number in the SS burst set, and the slot number in the SS burst set.

Example Embodiment 5

This embodiment describes the use of a combination of the PBCH DMRS time domain position and the frequency domain position to indicate part of the SS block index information.

In the structure shown in FIG. 4, the PBCH TTI=80 ms contains four SS burst sets of 20 ms cycles. Each SS burst set contains four SS bursts. Each SS burst is evenly distributed within the SS burst set, Configure an SS burst with a duration of 1 ms. SS burst internal structure, that is, SS block to the data transmission Slot mapping, "30 kHz 14 symbol time slot" as an example in the figure given further. This contains up to 8 SS blocks in the SS burst set. The numbers used here are for illustrative purpose only and other numbers may be used. For different frequency bands, the number of SS blocks, the subcarrier spacing of the signal channels within the SS block, and the mapping to the slot time domain may also be different.

The scenario considers how the base station indicates the eight SS block indexes to the terminal.

Figure 6:
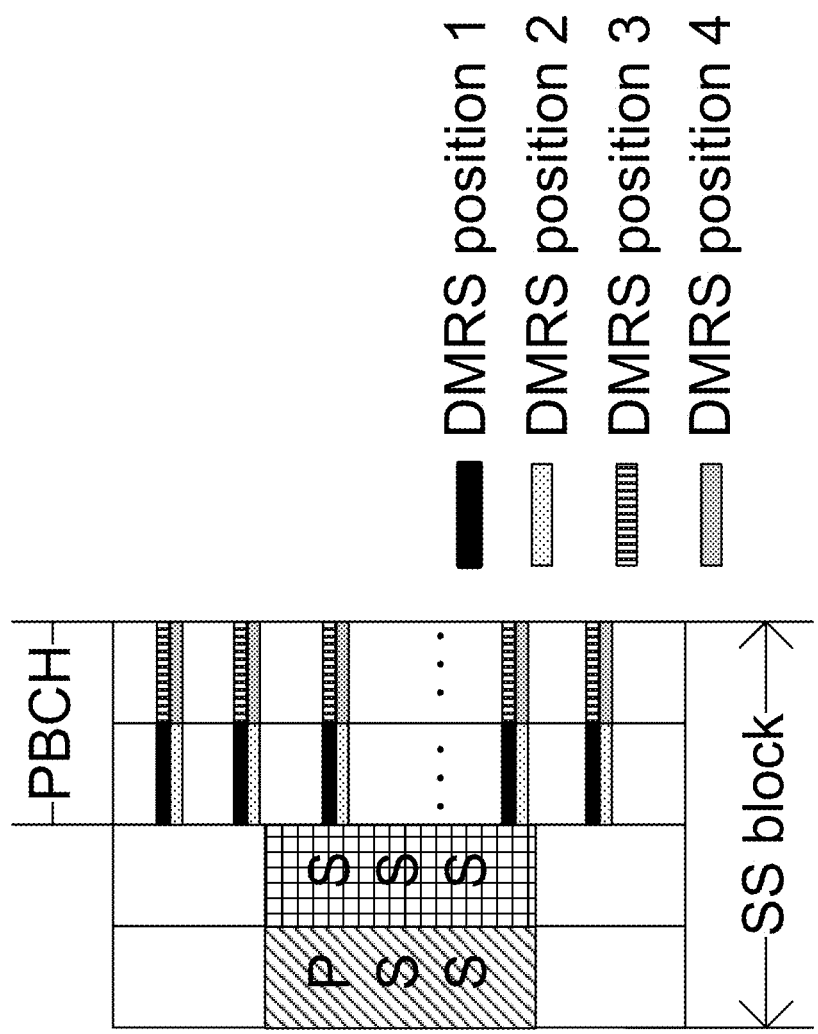
FIG. 6 shows an example of reference signal mapping to transmission slots.

In the present embodiment, as shown in FIG. 6, the PBCH DMRS may be mapped at four positions DMRS position 1, 2, 3, 4, which are used to indicate the number of the current SS block within the SS burst, or SS block, with the relative position within the SS burst. As shown in Table 4.

In FIG. 6, each DMRS position contains a set of DMRS time domain resources (such as several REs on a symbol). Each set of time-frequency resources is pre-defined by the system. The base station selects one of the positions to transmit DMRS sequence. In this embodiment, it is assumed that the sequence of DMRS is fixed.

The terminal first detects the synchronization signal of the cell and determines the two symbols of the PBCH based on the fixed relative positional relationship between the synchronization signal and the PBCH symbol and tries to use the DMRS sequence with the DMRS frequency domain position in each of the first and second PBCH symbols The DMRS position of the maximum correlation peak is considered to be the time-frequency domain position of the current DMRS. And then determine the current SS block belongs to the relative position within the SS burst. For example, when the current terminal determines the DMRS frequency domain position as DMRS position3, it is possible to determine that the current SS block is the third SS block within the SS burst. But cannot distinguish between the current SS burst is which one of the SS burst sets, this information can be considered by other instructions to further indicate (for example, for a set of DMRS position, define two sequences, and further distinguish SS burst set within the SS Burst number) to achieve an indication of the complete information for SS block index.

In the present embodiment, the partial SS block index is indicated by the PBCH DMRS frequency domain position, where the partial SS block index information is specifically the SS block number/relative position within the SS burst. It is also possible to use the PBCH DMRS frequency domain position to indicate other SS block index information, for example, the synchronization signal window group SS burst set number, the SS burst number in the SS burst set, the slot number in the SS burst, the SS block in the slot number, the SS block number in the SS burst set, and the slot number in the SS burst set.

Example Embodiment 6

This embodiment describes the use of the scrambling sequence of the PBCH DMRS sequence to indicate SS block index information.

In the structure shown in FIG. 2, specifically, in the present embodiment, the PBCH DMRS maps to the time-frequency resources fixed in each SS block, i.e., the DMRS sequence length, i.e., the inserted time-frequency domain interval, satisfies the PBCH demodulation performance demand, where only different sequences are used to indicate different SS blocks. In the structure shown in FIG. 2, there are 64 different SS blocks in the SS burst set. Therefore, one DMRS sequence and one of the 64 different DMRS sequences (such as sequence 0 to sequence 63) are defined to indicate different SS blocks, DMRS sequences and their scrambling sequences in the burst set may be pseudorandom sequence PN sequences (such as M sequences, etc.). Different SS blocks carry scrambling sequences of different PBCH DMRS sequences. The mapping between the scrambling sequence of the DMRS sequence and the SS block index is predefined. For example, the scrambling sequence 0 (S0) of the DMRS sequence and the SS block index 0 (SBI0), the scrambling sequence 1 of the DMRS sequence corresponds to SS block index 1, and so on, that is, the Sn<=>SBIn rule.

In addition, similarly to Embodiment 1, in order to realize randomization of inter-cell interference, the entire system can also define a plurality of sets of the above mapping relationships, and each set of mapping relationships is bound to the cell ID.

The terminal may first determine the cell ID by detecting the synchronization signal (including the primary and secondary synchronization signals) of the cell and obtains the mapping rule between the SBI and the DMRS sequence scrambling sequence corresponding to the cell ID. The terminal further uses the same fixed DMRS mapping resource and the scrambling sequence of the DMRS sequence carried in the current SS block is combined with the DMRS sequence scrambling sequence and the mapping relationship between the current cell SBI and the DMRS sequence scrambling sequence. The DMRS sequence of the DMRS sequence is used to attempt to descramble the DMRS sequence and determine the SBI.

In the present embodiment, different cells may define the same set of DMRS sequence scrambling sequences, and the mapping rules of the current cells are determined by the correspondence between the predefined cell IDs and the mapping rules. It is also possible to define a set of multiple sets of DMRS sequence scrambling sequences, for example, to divide the cell into three groups (which can still be modeled by the Cell ID pair 3 described above). Each group may correspond to a set of different DMRS sequence scrambling sequences. Terminals may identify the cell ID, and determine the set of DMRS sequence scrambling sequences carried by the current cell. For example, different groups of cells select mutually orthogonal scrambling sequences in the same SS block as the respective PBCH DMRS scrambling sequences, improve DMRS sequence identification, and use DMRS to do channel estimation performance.

Example Embodiment 7

The present embodiment describes the use of the scrambling sequence of the synchronization signal to indicate part of the SS block index information.

In the structure shown in FIG. 4, each SS burst set contains two SS bursts, each containing four SS blocks. In particular, the present embodiment utilizes the different scrambling sequences of the synchronization signal to distinguish the different SS bursts belonging to the SS burst set, which can be scrambled at a certain level of synchronization signals (e.g., there are 500 secondary synchronization signal sequence, scrambling code 1 and scrambling code 2 to scramble the secondary synchronization signal to obtain 1000 scrambled sequences). In this way, the terminal first identifies which SS burst and SS burst set that the current SS block belongs to by identifying the scrambling sequence of the secondary synchronization signal.

In the present embodiment, it is also possible to use other synchronization signal characteristics for the indication. These characteristics include, for example, the synchronization signal sequence or the mapping of the synchronization signals. In this regard, for example, the synchronization signals are first divided into groups or packets so that, within the same group/packet of synchronization signals, the sequence of the synchronization signals in the same group/packet corresponds to the same SS block index information. In addition, the synchronization signals are not limited to primary and secondary synchronization signals. Moreover, the synchronization signals can also include newly added synchronization signals.

The following examples will give some typical examples of combinations of instructions.

Example Embodiment 8

In this embodiment, the indication mode of the SS block index is that the PBCH DMRS sequence and the PBCH explicit information are combined to indicate that the combined range of the PBCHs is the corresponding SS block within the SS burst and the different SS burst sets.

PBCH explicit information refers to the SS block index indication information bits are contained in the PBCH information bits. For example, in the present embodiment, the complete SS block index information is indicated by the combination of the PBCH explicit information and the PBCH DMRS sequence.

In the structure shown in FIG. 2, PBCH TTI=80 ms, contains four burst bursts of 20 ms cycles, each SS burst set contains four SS bursts, each SS burst evenly distributed within the SS burst set, that is, every 5 ms Configure an SS burst with a duration of 0.5 ms. FIG. 2 also shows SS burst internal structure, that is, SS block to the data transmission Slot mapping, as "240 kHz 14 symbols time slot". This contains up to 64 SS blocks in the SS burst set.

The following scenario considers how the base station indicates to the terminal the 64 SS block indexes.

Specifically, when the PBCHs in the two SS blocks contain different information bits, the two PBCHs cannot be merged. Therefore, when considering PBCH explicit information to indicate part of the SS block index information, it is useful to consider the need for merging two PBCH channels.

Different SS blocks within a SS burst can support combination: the PBCH can use the 2 bit explicit information to indicate some of the SS block index information. Within the same SS burst, the 2 bit explicit information should be the same. This can ensure that two different PBCH channels within a relatively continuous SS block can reasonably well support the merge of the two PBCh channels. However, between different SS bursts, the explicit information for one PBCH channel in one SS burst is different from the explicit information of another PBCH channel in another SS burst and this can no longer support the merger.

As shown in Table 6: The PBCH column gives the explicit indication of the bearer in the SS block of each SS burst in each SS burst set in the PBCH TTI, such as the 16 SS blocks in SS burst 0 of the SS burst set 0, The PBCH carries "00"; 16 PBCH DMRS sequences are defined, corresponding to different SS blocks in the SS burst.

TABLE 6

| SS burst set | SS burst | PBCH explicit information | PBCH DMRS sequence |
|---|---|---|---|
| 0 | 0 | 00 | S0, S1, . . . , S15 |
| 0 | 1 | 01 | S0, S1, . . . , S15 |
| 0 | 2 | 10 | S0, S1, . . . , S15 |
| 0 | 3 | 11 | S0, S1, . . . , S15 |
| 1 | 0, 1, 2, 3 | 00, 01, 10, 11 | S0, S1, . . . , S15 |
| 2 | 0, 1, 2, 3 | 00, 01, 10, 11 | S0, S1, . . . , S15 |
| 3 | 0, 1, 2, 3 | 00, 01, 10, 11 | S0, S1, . . . , S15 |

In particular, one implementation can be divided into four PBCHs (PBCH0, PBCH1, PBCH2, PBCH3), corresponding to the PBCH information bits, including the SS block index indicating the domain {00, 01,10,11}. Each PBCH information bit (such as 40 bit, which contains the CRC bits) for channel coding and rate matching, the encoded information is obtained and the information is divided into four segments, each in a SS burst set within the transmission, respectively, corresponding to the SS burst set 0,1,2,3. In the case of SS burst set 0, SS burst 0 corresponds to PBCH0 (including SS block index indicates bit 00). Different SSs within SS burst 0 are distinguished by different PBCH DMRS sequences. Predefined DMRS sequences are different from SS bursts SS block mapping relationship (such as S0 corresponds to SS block 0), and then SS burst 0 within each SS block PBCH information and PBCH DMRS have been identified. Similarly, each SS block within the other SS bursts in the SS burst set 0 can obtain the corresponding PBCH information bits and PBCH DMRS. Similarly, the base station will also generate PBCHs for other SS burst sets within the PBCH TTI. In order to achieve randomization of inter-cell interference, the whole system can also define the mapping relationship between the above-mentioned DMRS sequence and the SS block number in the SS burst, and each group mapping relationship is bound to the cell ID.

In this processing mode, the terminal first determines the cell ID by detecting the synchronization signal (including the primary and secondary synchronization signals) of the cell. Next, the terminal obtains the mapping rule between the SBI and the DMRS sequence corresponding to the cell ID. The terminal then compares the mapping rules between the predefined fixed DMRS mapping resources. For this, the DMRS sequence in the current SS block is first determined, and the number of SS blocks within the SS burst is determined by combining the DMRS sequence and the mapping relationship between the different SS block numbers and the DMRS sequence in the current SS burst.

Further, the PBCH is decoded using the channel estimation result of the PBCH DMRS, and the SS block index indicates that the bit is 00 from the PBCH. Therefore, it is determined that the current SS block belongs to the SS burst 0 in the SS burst set.

In addition, since the corresponding SS blocks of different SS burst sets also have the same information bits, the corresponding SS blocks between SS burst sets can also be combined.

In the present embodiment, the original information bits supporting the PBCH remain unchanged within the SS burst and can therefore be merged within the SS burst range. Similarly, it is also possible to consider supporting PBCHs in time slots, radio frames, subframes, SS bursts, and PBCH TTIs, and it is the PBCH original information bits should remain unchanged within the corresponding range.

Example Embodiment 9

In the present embodiment, the indication of the SS block index is a combination of PBCH implicit information and PBCH DMRS sequence.

The PBCH implicit indication indicates that different SS block index information is implied by different PBCH processing methods. The PBCH processing mode includes one or more of the following: redundancy version, cyclic shift, scrambling, CRC mask of the broadcast channel, and so on.

The cyclic shift of the PBCH information bits implicitly indicates the different SS blocks within the different SS bursts, and the demodulated reference signal sequence of the PBCH is used to indicate the different SSs in the SS burst set. In this case, other combination of instructions is not excluded.

As shown in Table 7, the PBCH DMRS column gives the PBCH DMRS sequence corresponding to the different SS bursts in the SS burst set, where the DMRS of the PBCHs in all SS blocks in SS burst0 uses sequence 0; all SS blocks in SS burst1 The DMRS of the PBCH uses sequence 1.

Four PBCH cyclic shift amounts 0, $\Delta N$, $2\Delta N$, and $3\Delta N$ are defined, corresponding to the different SS blocks in the SS burst.

TABLE 7

| SS burst set | SS burst | PBCH DMRS | PBCH cyclic shift |
|---|---|---|---|
| 0 | 0 | DMRS sequence 0 | 0, $\Delta N$, $2\Delta N$, $3\Delta N$ |
| 0 | 1 | DMRS sequence 1 | 0, $\Delta N$, $2\Delta N$, $3\Delta N$ |
| 1 | 0 | DMRS sequence 0 | 0, $\Delta N$, $2\Delta N$, $3\Delta N$ |
| 1 | 1 | DMRS sequence 1 | 0, $\Delta N$, $2\Delta N$, $3\Delta N$ |
| 2 | 0 | DMRS sequence 0 | 0, $\Delta N$, $2\Delta N$, $3\Delta N$ |
| 2 | 1 | DMRS sequence 1 | 0, $\Delta N$, $2\Delta N$, $3\Delta N$ |

TABLE 7-continued

| SS burst set | SS burst | PBCH DMRS | PBCH cyclic shift |
|---|---|---|---|
| 3 | 0 | DMRS sequence 0 | 0, $\Delta N$, $2\Delta N$, $3\Delta N$ |
| 3 | 1 | DMRS sequence 1 | 0, $\Delta N$, $2\Delta N$, $3\Delta N$ |

In this processing mode, each SS block inside the SS burst contains the same PBCH information bits, but the cyclic shift of the information bits are different. When the terminal combines the PBCHs in the two SS blocks, relative deviation of cyclic shift of two SS blocks can be obtained by determining the time interval of the SS block. When the two SS blocks differ by a distance of 14, the two SS blocks are separated from each other by two of the SS blocks in the SS burst. For example, according to the configuration of FIG. 4, ($2\Delta T$), the cyclic shift of the two PBCH information bits is different by $2\Delta N$. Before the two PBCHs are merged, the latter PBCH is shifted by $2\Delta N$ in the reverse direction to obtain the same as the previous PBCH Information bits, this time two PBCH can be combined to improve the success rate of decoding.

In this case, the two PBCHs may still be information after cyclic shift. A terminal may decode the different PBCHs of the combined PBCHs. Before decoding the PBCH, a terminal may estimate the channels according to the measurement of DMRS. The DMRS sequence is used to estimate the channel by using the DMRS sequence 0 and the DMRS sequence 1 to correlate the received signal at the DMRS position. And the DMRS sequence (e.g., DMRS sequence 0) with greater correlation peak is determined as the currently used DMRS sequence. The channel estimation result is used for PBCH decoding. The PBCH is considered to be decoded when a PBCH is cyclically shifted, the CRC check is completed and the decoding of the PBCH is completed. The corresponding cyclic shift number can represent different SS block index information.

In the present embodiment, a part of SS block index information is carried in the PBCH DMRS sequence, and similarly, the PBCH DMRS sequence combination, the scrambling code of the DMRS sequence, the time domain position of the PBCH DMRS, and the frequency domain position of the PBCH DMRS can also be considered to carry part of the SS block index information. Further, some SS block index information may also be carried by a combination of more than one of the following information: PBCH DMRS sequence, PBCH DMRS sequence combination, DMRS sequence scrambling code, PBCH DMRS time domain position, and PBCH DMRS frequency domain position.

Example Embodiment 10

In the present embodiment, the indication of the SS block index is a combination of the PBCH scrambling code and the PBCH DMRS sequence. The scrambling code of the PBCH information bits implicitly indicates the different SS blocks within the SS burst, and the demodulation reference signal sequence of the PBCH is used to indicate the different SS bursts within the SS burst set. In this case, combination of other instructions is not excluded.

In Table 8, the PBCH DMRS column shows the PBCH DMRS sequence corresponding to the different SS bursts in the SS burst set. For example, the DMRS of the PBCHs in all SS blocks in SS burst0 uses sequence 0. The time domain of the DMRS The position is pre-defined by the system, that is, DMRS is inserted in a fixed frequency domain resource (e.g., resource unit, RE, Resource Element) on the symbol where the PBCH is located.

The DMRS of PBCHs in all SS blocks in SS burst1 uses scrambling sequence 1. The scrambling sequence is a scrambling process used for bit encoding PBCH.

The system may use four PBCH scrambling sequences: scrambling sequences 1, 2, 3, 4, respectively, corresponding to different SS blocks within the SS burst.

TABLE 8

| SS burst set | SS burst | PBCH DMRS | PBCH scrambling code |
|---|---|---|---|
| 0 | 0 | DMRS sequence 0 | Scrambling sequence 1, 2, 3, 4 |
| 0 | 1 | DMRS sequence 1 | Scrambling sequence 1, 2, 3, 4 |
| 1 | 0 | DMRS sequence 0 | Scrambling sequence 1, 2, 3, 4 |
| 1 | 1 | DMRS sequence 1 | Scrambling sequence 1, 2, 3, 4 |
| 2 | 0 | DMRS sequence 0 | Scrambling sequence 1, 2, 3, 4 |
| 2 | 1 | DMRS sequence 1 | Scrambling sequence 1, 2, 3, 4 |
| 3 | 0 | DMRS sequence 0 | Scrambling sequence 1, 2, 3, 4 |
| 3 | 1 | DMRS sequence 1 | Scrambling sequence 1, 2, 3, 4 |

A terminal may first detect the synchronization signal and determine the time domain resource of the PBCH according to the relative positional relationship between the PBCH and the synchronization signal, and then determines the RE of the DMRS inserted on the PBCH symbol. The DMRS sequence (e.g., DMRS sequence 0) with greater correlation peak may be determined as the currently used DMRS sequence by using the DMRS sequence 0 and DMRS sequence 1 respectively to correlate the received signal at the DMRS position, and then the DMRS sequence 0 Channel to estimate the channel estimation result for PBCH decoding. During the decoding of the PBCH, the terminal may attempt to descramble the PBCH using the scrambling sequence 1, 2, 3, 4, respectively. After attempting to descramble the PBCH with a certain scrambling sequence, the CRC is further decoded by the CRC checker. Correspondingly, the currently used scrambling sequence indicates the position/number of the current SS block within the SS burst, combined with the DMRS sequence, complete the SS block SBI acquisition.

In this processing mode, each SS block within the SS burst contains the same PBCH information bits, but the scrambling of the information bits is different. If a terminal wants to combine the PBCHs in the two SS blocks, it should assume different scrambling sequence combination. In this case, for example, if the terminal wishes to combine the PBCHs in two adjacent SS blocks, and the following four scrambling sequences can be used to perform the descrambling of two PBCHs: {scrambling sequence 1, scrambling sequence 2}, {scrambling code sequence 2, scrambling code sequence 3}, {scrambling code sequence 3, scrambling code sequence 4}, {scrambling code sequence 4, scrambling code sequence 1}. The descrambled PBCHs are soft-merged and decoded. The two PBCHs are decoded with scrambling sequence combination, e.g., with {scrambling sequence 2 and scrambling sequence 3}, the two descrambled data are combined and decoded. If successful, it shows that the two SS blocks are the SS block corresponding to scrambling sequence 2, and scrambling sequence 3. Combining with the DMRS sequence, completes the SS block SBI acquisition.

Example Embodiment 11

In the present embodiment, the indication mode of the SS block index is: PBCH implicit information+synchronization signal scrambling, and the PBCH support range is PBCH TTI.

Using the characteristics of the synchronization signal to indicate part of the SS block index information includes one or more of the following: synchronization signal sequence, synchronization signal scrambling, synchronization signal mapping. PBCH processing method implicitly includes different SS block index information, where the PBCH processing methods include one or more of the following: cyclic shift, scrambling code, CRC mask and so on. In the present embodiment, the complete SS block index information is indicated by the PBCH implicit indication in combination with the synchronization signal.

Specifically, the PBCH information bits remain unchanged in the PBCH TTI, that is, PBCHs are supported in the PBCH TTI.

In the structure shown in FIG. 2, the different scrambling sequences of the synchronization signal are used to distinguish different SS bursts. The scrambling sequence can be scrambled at a certain level of synchronization signals (e.g., 500 synchronization sequences, and two scrambling codes to scramble the secondary synchronization signal to obtain 1000 scrambled sequences); the PBCH of the different SS blocks within the same SS burst uses different cyclic shifts.

As shown in Table 9, the synchronization signal scrambling sequence gives the scrambling sequence of the synchronization signal in the SS burst of each SS burst in each SS burst set in the PBCH TTI, such as 16 in the SS burst 0 of the SS burst set 0 SS2. The different PBCH cyclic offsets {ΔN, 2ΔN, ..., 15ΔN} correspond to different SS blocks, and the different RVs correspond to different bursts within the PBCH TTI. Specifically, the PBCH information bits (such as 40 bit, which contains CRC bits) are processed for channel coding and rate matching. Upon completion of this process, the obtained encoded information is divided into four segments and each divided segment is transmitted within a SS burst set and this transmitted segment is defined as a redundant version of RV, thus forming a total of four RVs, RV 0, RV1, RV 2, and RV3. For example, RV0 corresponds to SS bust set 0, RV1 corresponds to SS burst set 1, RV2 corresponds to SS burst set 2, and RV3 corresponds to SS burst set 3.

TABLE 9

| SS burst set | SS burst | Synchronous signal scrambling | PBCH cyclic shift amount | RV |
|---|---|---|---|---|
| 0 | 0 | Scrambling code 1 | 0, ΔN, 2ΔN, ..., 15ΔN | $RV_0$ |
| 0 | 1 | Scrambling code 2 | 0, ΔN, 2ΔN, ..., 15ΔN | $RV_0$ |
| 1 | 0 | Scrambling code 1 | 0, ΔN, 2ΔN, ..., 15ΔN | $RV_1$ |
| 1 | 1 | Scrambling code 2 | 0, ΔN, 2ΔN, ..., 15ΔN | $RV_1$ |
| 2 | 0 | Scrambling code 1 | 0, ΔN, 2ΔN, ..., 15ΔN | $RV_2$ |
| 2 | 1 | Scrambling code 2 | 0, ΔN, 2ΔN, ..., 15ΔN | $RV_2$ |
| 3 | 0 | Scrambling code 1 | 0, ΔN, 2ΔN, ..., 15ΔN | $RV_3$ |
| 3 | 1 | Scrambling code 2 | 0, ΔN, 2ΔN, ..., 15ΔN | $RV_3$ |

The scrambling code 1 corresponds to the previous SS burst in the SS burst set, and the scrambling code 2 corresponds to the last SS burst in the SS burst set. In this case, the scrambling sequence of the two secondary synchronization signals is defined as follows: Inside the SS burst; there are 16 SS blocks, and the interval between adjacent SS blocks. The time shift in turn corresponds to the PBCH cyclic shift amount is 0, ΔN, 2ΔN, ..., 15ΔN, respectively.

Similarly, the base station will also generate synchronization signals and PBCHs for other SS burst sets within the PBCH TTI. The difference is that the RVs used by the SS burst set PBCH are different.

In this processing mode, the terminal first identifies which SS burst the current SS block belongs by identifying the scrambling sequence of the secondary synchronization signal.

Further, each SS block within the SS burst contains the same PBCH information bits, but the cyclic shift of the information bits are different. When the terminal combines the PBCHs in the two SS blocks, relative deviation of cyclic shift of two SS blocks can be got by determining the time interval of the SS block. For example, according to the configuration of FIG. 2, two SS blocks in the SS burst are cyclically shifted by seven symbols (such as ΔT), and when two SS blocks differ by 14 symbols (for example, That is, 2ΔT), the cyclic shift of the two PBCH information bits is different by 2ΔN. When the terminal combines the two PBCHs, the latter PBCH is cyclically shifted by 2ΔN in the reverse direction to obtain the same information bits as the previous PBCH. At this point two PBCH can be combined to improve the success rate of decoding. At this point the two PBCH may still be the information after the cyclic shift, you need to try to combine the PBCH after the different cycle to try to decode, if the CRC check success, then complete the PBCH decoding, then the corresponding the number of cycle shifts can represent the index of the different SS blocks within the SS burst.

Since the terminal may begin receiving the initial access, i.e., receive the synchronization signal and the physical broadcast channel in any one of the SS burst set cycles, the PB of the PBCH may be either RV0-3, and the terminal also needs to use any of the four RVs described above To try the decoding process described above. If an RV decoding is unsuccessful, assume another RV, continue to try.

For example, the PBCH of SS block 1 and SS block 3 are combined, and the terminal initially determines that the latter PBCH is cyclically shifted twice more than the previous PBCH based on the time domain interval of the two SS blocks. Then, the reverse cyclic shift latter PBCH by 2ΔN and the reverse cyclically shifted PBCH is soft-merged with the previous PBCH. At this time, the combined PBCH is still the result of a cyclic shift in a PBCH after 4-segment coding. The terminal assumes that the currently detected PBCH is any one of the four segments, and attempts to reverse cycle shift of the PBCH, when trying to combine the PBCH with ΔN reverse cyclic shift, try decoding, through the CRC check, then determine the currently detected PBCH code field (such as segment 1, corresponding to SS burst set1) and the combined PBCH cyclic shift value is ΔN, that is, the previous SS block is SS block 1, and since the latter SS block And the previous SS block is different from 2ΔN, then the next SS block is SS block 3. Further, it is judged by the synchronization signal of the two SS blocks which, based on the previously detected synchronization signal, that the current scrambling sequence is sequence 1, it is determined that it belongs to SS burst1, and the identification process of SS block index is completed The previous PBCH belongs to the SS block 1 of SS burst 1 of SS burst set 1, and the latter PBCH belongs to SS block 3 of SS burst 1 of SS burst set 1.

In addition, since the SS blocks of different SS burst sets within PBCH TTI also contain the same information bits, the SS blocks between SS burst sets can also be merged.

In the present embodiment, the PBCH implicitly indicates the manner in which different cyclic shifts are defined, or different scrambling codes or different CRC blocks may be used to implicitly indicate part of the SS block index information.

In addition to the synchronization signal scrambling, the characteristics of the synchronization signal may be any of the following: a synchronization signal sequence, a synchronization signal mapping method, or any combination of a synchronization signal sequence, a synchronization signal scrambling code, and a synchronization signal mapping scheme.

Example Embodiment 12

In the present embodiment, the indication mode of the SS block index is: PBCH DMRS time-frequency domain position+PBCH DMRS sequence+synchronization signal sequence and PBCH-enabled consolidation range is PBCH TTI.

Specifically, the PBCH information bits remain unchanged in the PBCH TTI, that is, PBCHs are supported in the PBCH TTI.

Figure 7:
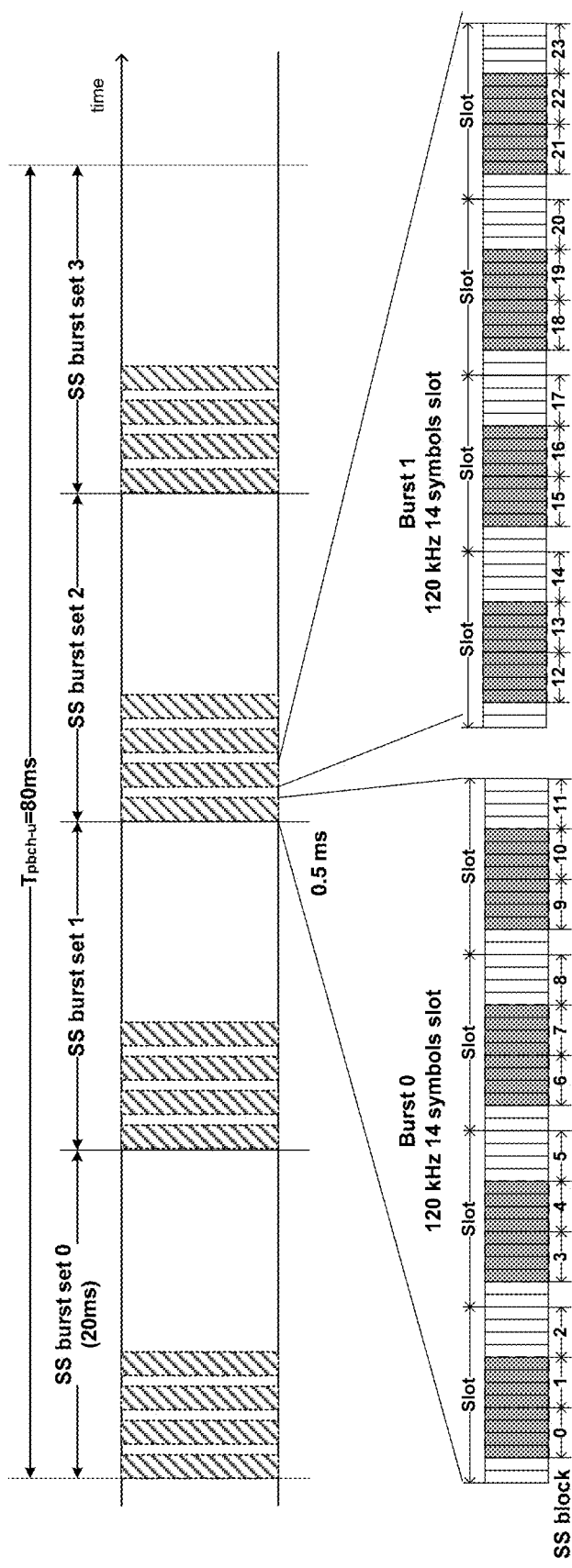
FIG. 7 shows an example of a transmission burst.

In the structure shown in FIG. 7, the PBCH TTI=80 ms contains four SS burst sets of 20 ms cycles, each of which contains four SS bursts, each of which is mapping centrally within the previous 5 ms of SS burst set, and the duration of each SS burst is 0.5 ms. SS burst internal structure, that is, mapping structure from SS blocks to the data transmission Slots, "120 kHz 14 symbol time slot" as an example in the figure is given further. This contains up to 48 SS blocks in the SS burst set. Note: The mapping of the SS block to the data transmission slot and the number of SS blocks included in the SS burst set are only examples. The possibility of other number of SS blocks is not excluded. For different frequency bands, the number of SS blocks, the subcarrier spacing of the signal channels within the SS block, and the time domain structure of mapping from SS blocks to the slots may also be different.

The scenario considers how the base station indicates to the terminal the 48 SS block indexes.

As shown in Table 10, in the present embodiment, the synchronization signal is divided into three sequence sets, and the different synchronization signal sequence sets are used to distinguish the different SS blocks in the slot (for example, all the synchronization signals in Slot 0 are set in the synchronization signal sequence set, It is possible to select the same synchronization signal sequence in order to support the combined detection of the synchronization signal within Slot0. Typically, the primary synchronization signal contains three root sequences, which can be divided into three groups based on the different root sequence of the primary synchronization signal), The PBCH DMRS sequence is used to distinguish between different Slots within the SS burst (define four different PBCH DMRS sequences: {PBCH DMRS sequence 0, 1, 2, 3}), PBCH DMRS time zone position is used to indicate SS burst set (As shown in FIG. 6, defining four PBCH DMRS time-frequency positions, corresponding to different SS bursts in the SS burst set, respectively).

TABLE 10

| SS burst set | SS burst | DMRS time-frequency position | Slot | PBCH DMRS | SS block | Synchronization signal sequence |
|---|---|---|---|---|---|---|
| 0 | 0 | DMRS position 1 | 0 | PBCH | 0 | Sequence set 0 |
|   |   |   |   | DMRS | 1 | Sequence set 1 |
|   |   |   |   | sequence 0 | 2 | Sequence set 2 |
|   |   |   | 1 | PBCH | 3 | Sequence set 0 |
|   |   |   |   | DMRS | 4 | Sequence set 1 |
|   |   |   |   | sequence 1 | 5 | Sequence set 2 |

TABLE 10-continued

| SS burst set | SS burst | DMRS time-frequency position | Slot | PBCH DMRS | SS block | Synchronization signal sequence |
|---|---|---|---|---|---|---|
|   |   |   | 2 | PBCH | 6 | Sequence set 0 |
|   |   |   |   | DMRS | 7 | Sequence set 1 |
|   |   |   |   | sequence 2 | 8 | Sequence set 2 |
|   |   |   | 3 | PBCH | 9 | Sequence set 0 |
|   |   |   |   | DMRS | 10 | Sequence set 1 |
|   |   |   |   | sequence 3 | 11 | Sequence set 2 |
| 0 | 1 | DMRS position 1 | 0 | PBCH | 12 | Sequence set 0 |
|   |   |   |   | DMRS | 13 | Sequence set 1 |
|   |   |   |   | sequence 0 | 14 | Sequence set 2 |
|   |   |   | 1 | PBCH | 15 | Sequence set 0 |
|   |   |   |   | DMRS | 16 | Sequence set 1 |
|   |   |   |   | sequence 1 | 17 | Sequence set 2 |
|   |   |   | 2 | PBCH | 18 | Sequence set 0 |
|   |   |   |   | DMRS | 19 | Sequence set 1 |
|   |   |   |   | sequence 2 | 20 | Sequence set 2 |
|   |   |   | 3 | PBCH | 21 | Sequence set 0 |
|   |   |   |   | DMRS | 22 | Sequence set 1 |
|   |   |   |   | sequence 3 | 23 | Sequence set 2 |
| 0 | 2 | DMRS position 2 | 0 | PBCH | 24 | Sequence set 0 |
|   |   |   |   | DMRS | 25 | Sequence set 1 |
|   |   |   |   | sequence 0 | 26 | Sequence set 2 |
|   |   |   | 1 | PBCH | 27 | Sequence set 0 |
|   |   |   |   | DMRS | 28 | Sequence set 1 |
|   |   |   |   | sequence 1 | 29 | Sequence set 2 |
|   |   |   | 2 | PBCH | 30 | Sequence set 0 |
|   |   |   |   | DMRS | 31 | Sequence set 1 |
|   |   |   |   | sequence 2 | 32 | Sequence set 2 |
|   |   |   | 3 | PBCH | 33 | Sequence set 0 |
|   |   |   |   | DMRS | 34 | Sequence set 1 |
|   |   |   |   | sequence 3 | 35 | Sequence set 2 |
| 0 | 3 | DMRS position 3 | 0 | PBCH | 36 | Sequence set 0 |
|   |   |   |   | DMRS | 37 | Sequence set 1 |
|   |   |   |   | sequence 0 | 38 | Sequence set 2 |
|   |   |   | 1 | PBCH | 39 | Sequence set 0 |
|   |   |   |   | DMRS | 40 | Sequence set 1 |
|   |   |   |   | sequence 1 | 41 | Sequence set 2 |
|   |   |   | 2 | PBCH | 42 | Sequence set 0 |
|   |   |   |   | DMRS | 43 | Sequence set 1 |
|   |   |   |   | sequence 2 | 44 | Sequence set 2 |
|   |   |   | 3 | PBCH | 45 | Sequence set 0 |
|   |   |   |   | DMRS | 46 | Sequence set 1 |
|   |   |   |   | sequence 3 | 47 | Sequence set 2 |

In this processing mode, the terminal first identifies SS block number within the slot by identifying the sequence of the synchronization signal. Further, the time series of the current PBCH DMRS and the sequence of the PBCH DMRS are determined by using the possible DMRS sequence to correlate with the received data at different time-frequency positions of the PBCH DMRS, and then determine Slot number within SS burst, and which SS burst in the SS burst set. Complete the SS block index recognition process.

In addition, since the present embodiment indicates the index information by not introducing the PBCH explicit information, all the SS blocks in the PBCH TTI can be combined.

In order to achieve randomization of inter-cell interference, the entire system can also define the more than one mapping relationship between the above-mentioned PBCH DMRS time-frequency domain position+PBCH DMRS sequence+synchronization signal sequence and SBI, and each mapping relationship is bound to the cell ID.

Example Embodiment 13

In the present embodiment, the indication mode of the SS block index is that the combination of the PBCH explicit information and the characteristics of the synchronization signal, and the combination of the PBCHs supporting the SS burst and the corresponding SS bursts of the different SS burst sets.

PBCH explicit information means that the corresponding SS block index indication information bits are included in the PBCH information bits. The characteristics of the synchronization signal include a synchronization signal sequence, a scrambling code sequence, a mapping mode, and the like. In the present embodiment, the complete SS block index information is indicated by the combination of the PBCH explicit information and the synchronization signal scrambling sequence.

In the structure shown in FIG. 4, the PBCH TTI=80 ms contains four SS burst sets of 20 ms cycles. Each SS burst set contains four SS bursts. Each SS burst is evenly distributed within the SS burst set, Configure an SS burst with a duration of 1 ms. SS burst internal structure, that is, structure of mapping from SS block to the data transmission Slot, "30 kHz 14 symbol time slot" as an example in the figure is given further. This contains up to 8 SS blocks in the SS burst set. Note: The mapping of the SS blocks to the data transmission slots and the number of SS blocks included in the SS burst set are only examples. The other number of SS blocks is not excluded. For different frequency bands, the number of SS blocks, the subcarrier spacing of the signal channels within the SS block, and the time domain structure of mapping from SS blocks to the slots may also be different.

The scenario considers how the base station indicates the eight SS block indexes to the terminal.

Specifically, when the PBCHs in the two SS blocks contain different information bits, the two PBCHs cannot be merged. Therefore, when considering PBCH explicit information to indicate part of the SS block index information, it is necessary to consider the merging of PBCH demand.

SS blocks within the SS burst support the combination: PBCH 1 bit explicit information to indicate part of the SS block index information, the same SS burst contains the same 1 bit explicit information, to ensure that the relative continuous SS block PBCH can be a good support for the combination. And combination between the SS bursts are no longer supported due to explicit information are different.

As shown in Table 11: The PBCH column gives explicit indication carried in the SS block of each SS burst in each SS burst set in the PBCH TTI, such as the four SS blocks in SS burst 0 of the SS burst set 0, The PBCH carries "0"; four different synchronization signal scrambling codes are defined, which are scrambled on a sequence of synchronization signals, such as secondary synchronization signals. The different scrambling codes represent different SS blocks within the SS burst.

TABLE 11

| SS burst set | SS burst | PBCH | Synchronous signal scrambling |
|---|---|---|---|
| 0 | 0 | 0 | Scrambling code 0, . . . , Scrambling code 3 |
| 0 | 1 | 1 | Scrambling code 0, . . . , Scrambling code 3 |

In particular, it can be divided into two PBCHs (denoted as PBCH0, PBCH1), which correspond to the PBCH information bits, including the SS block index indicating field {0, 1}, respectively, due to the difference in PBCH information contents. Each of the PBCH information bits (such as 40 bits, which contains CRC bits) performs channel coding and rate matching to obtain the encoded information, which is divided into four segments, each of which is transmitted in an SS burst set, SS burst 0 transmission PBCH0 encoded first segment, SS burst set 1 SS burst 0 transmission PBCH0 encoded second segment, SS burst set 2 SS burst 0 transmission PBCH0 encoded third segment, SS burst set 3 SS burst 0 transmission PBCH0 encoded after the fourth paragraph. In the case of SS burst set 0, the SS blocks used in SS burst 0 correspond to PBCH0. Further, different SS blocks within each SS burst use different secondary synchronization sequence scrambling codes, corresponding to {scrambling code 0, . . . , scrambling code 3}.

Similarly, the base station will also generate the PBCH and synchronization signals for the SS blocks within the other SS burst sets in the PBCH TTI. In addition, in different SS burst sets, send different encoded PBCH code segment, can support SS burst set PBCH incremental redundancy (IR, incremental redundancy combining), to obtain greater merger gain, that is, each one PBCH information bits (such as 40 bit, which contains CRC bits) for channel coding and rate matching, the encoded information is obtained, the information is divided into four segments, each segment transmitted in a SS burst set, respectively, corresponding to SS burst set0, 1, 2, 3.

In this processing mode, the terminal first identifies the SS block which belongs to the SS burst by identifying the scrambling sequence of the secondary synchronization signal. Further, each SS block inside the SS burst contains the same PBCH information bits, and when the terminal can merge the PBCHs within the different SS blocks within the SS burst, the terminal will soft-merge the PBCHs in the two SS blocks received and it is assumed that the currently merged PBCH is any of the four segments. If the decoding is successful, that is, by CRC check, the currently detected PBCH code field is determined, and the current SS block belongs to SS burst 0 Or SS burst 1.

In addition, since the corresponding SS blocks of different SS burst sets within PBCH TTI also contain the same information bits, the corresponding SS blocks between SS burst sets can also be combined.

In the present embodiment, using the scrambling sequence of the synchronization signal to indicate part of SS block index. It is also possible to use other synchronization signal characteristics to indicate, for example, the synchronization signal sequence (i.e., grouping the synchronization signal sequences, the sequences in the same group corresponds to the same SS block index), or the synchronization signal mapping mode. Furthermore, the synchronization signal can also be a new synchronization signal.

Example Embodiment 14

This embodiment describes the SS block index information using a combination of the PBCH DMRS sequence, the DMRS frequency domain position, and the DMRS time domain position.

In the structure shown in FIG. 2, the scheme considers how the base station indicates to the terminal the 64 SS block index {SS block index 0 to 63}: 64 SS block index information and 6 bits. In this embodiment, the PBCH DMRS sequence indication SS block index, using the DMRS time domain position indicating the least significant bit of the SS block index, using the DMRS frequency domain position to indicate the middle 2 significant bits of the SS block index, i.e., bits 4, 5.

Figure 8:
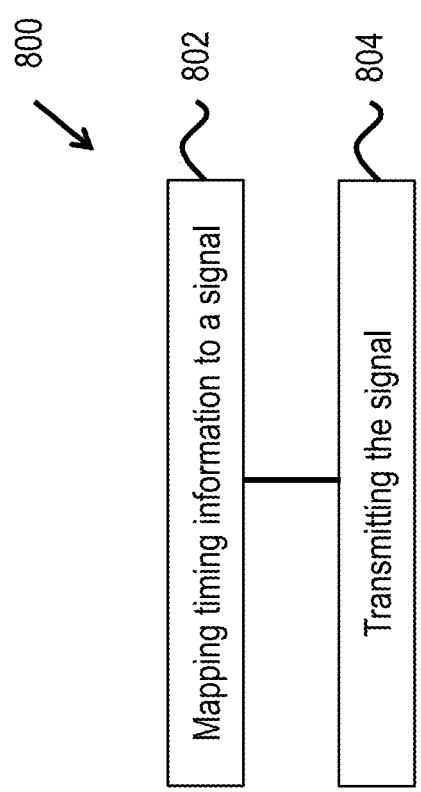
FIG. 8 is a flowchart of an example wireless communication method.

As shown in FIG. 8, eight PBCH DMRS sequences are defined, corresponding to the upper three bits of the SS block index. The two PBCH DMRS time domain positions are defined as the time domain position 1 (the previous symbol of the PBCH), the time domain Position 2 (the last symbol of the PBCH) corresponds to the least significant bit of the SS block; define the four PBCH DMRS frequency domain positions, which are the frequency domain positions 1, 2, 3, 4, respectively, corresponding to the SS block index 2 active bits in the middle. As shown in Tables 12, 13 and 14.

TABLE 12

| SS block index Three most significant bits | PBCH DMRS Sequence |
|---|---|
| 000 | 1 |
| 001 | 2 |
| 010 | 3 |
| 011 | 4 |
| 100 | 5 |
| 101 | 6 |
| 110 | 7 |
| 111 | 8 |

Table 13 shows a mapping between M number of least significant bits (M=1 in the example shown in Table 13) and DMRS position.

TABLE 13

| SS block index 1 last significant bit | PBCH DMRS time domain position |
|---|---|
| 0 | 1 |
| 1 | 2 |

Table 14 shows a relationship between X number of middle bits and the corresponding DMRS position (X is an integer, with value 2 in the illustrated example of Table 14).

TABLE 14

| SS block index 2 middle bits | PBCH DMRS frequency domain position |
|---|---|
| 00 | 1 |
| 01 | 2 |
| 10 | 3 |
| 11 | 4 |

When the SS block index is 110001, the base station transmits sequence 7 at time domain position 2 and frequency domain position 1 according to the mapping relationship of the above tables.

At this time, the terminal determines the index of the current SS block by identifying the time-frequency domain resources of the PBCH DMRS and the sequence, and corresponding to the corresponding relationship in the table.

Similar to the present embodiment, the use of DMRS other sequence features such as DMRS scrambling, or synchronization signal characteristics (synchronization signal sequence, scrambling sequence of synchronization signals), or physical broadcast channel transmission mode (physical broadcast channel bearer information bits, The cyclic shift of the physical broadcast channel information bits, the scrambling of the physical broadcast channel, and the CRC mask of the physical broadcast channel), it is possible to indicate that any valid bit in the SS block index is possible.

FIG. 8 is a flowchart of an example wireless communication method 800. The method 800 may be implemented at a base station (e.g., BS 1002).

The method 800 includes, at 802, mapping timing information in a wireless communication network to a signal, wherein the timing information includes information related to a synchronization signal (SS) block index and the signal comprises a reference signal on a broadcast channel, and/or a synchronization signal.

As described in the various example embodiments in this document, the information related to the SS block index may include at least one of: an SS burst set number, an SS burst number in an SS burst set, a slot number in the SS burst, an SS block number in the slot, an SS block number in the SS burst set, an SS block number in the SS burst, the slot number in the SS burst set, N least significant bits of the SS block index, M most significant bits of the SS block index, or X middle significant bits of SS block index, where N, M and X are non-negative integers.

In some embodiments, a reference signal that enables channel estimation by the receiving wireless device may be used. For example, in some embodiments, the DMRS may be used as the reference signal. At least one of the following DMRS features can be used for the indication of the SS Block index: a DMRS sequence, a combination of DMRS sequences on a plurality of symbols, DMRS scrambling information, DMRS time domain position, DMRS frequency domain position.

In some embodiments, the mapping between the timing information and the signal features may be a function of the identity of cell in which the method 800 is being implemented.

Example Embodiment 15

In this example embodiment, the System Frame Number (SFN) is used to indicate the SS block index information and the PBCH bearer display information.

For example, assume that the system frame number contains 10 bits. Since the PBCH TTI is 80 ms and the radio frame length is 10 ms, that is, the PBCH TTI contains 8 radio frames. In the eight radio frames of a PBCH TTI, all PBCHs contain the same SFN indication field, which indicates the upper 7 bits (i.e., 7 MSBs, most significant bits) of the SFN. The indication of 3 LSBs of the SFN should be further considered for distinguishing different radio frames within the PBCH TTI. The lower 3 bits (i.e. 3 LSBs, least significant bits) of the SFN may be used to indicate relevant information of the SS block index. Some implementation options include the following cases.

For periodicity of SS burst set no longer than the length of radio frame (e.g., 5 ms, 10 ms), a radio frame contains one or two SS burst set(s). Different index/indication of SS burst set may correspond to a single radio frame. Thus, index/indication of SS burst set can indicate a part of SFN information (e.g., 3 LSBs), wherein the index/indication of SS burst set within PBCH TTI can be indicated by different RVs of PBCH implicitly just like LTE. In some embodiments, the scrambling code or Cyclic Redundancy Check (CRC) mask of PBCH can also be considered.

Figure 12:
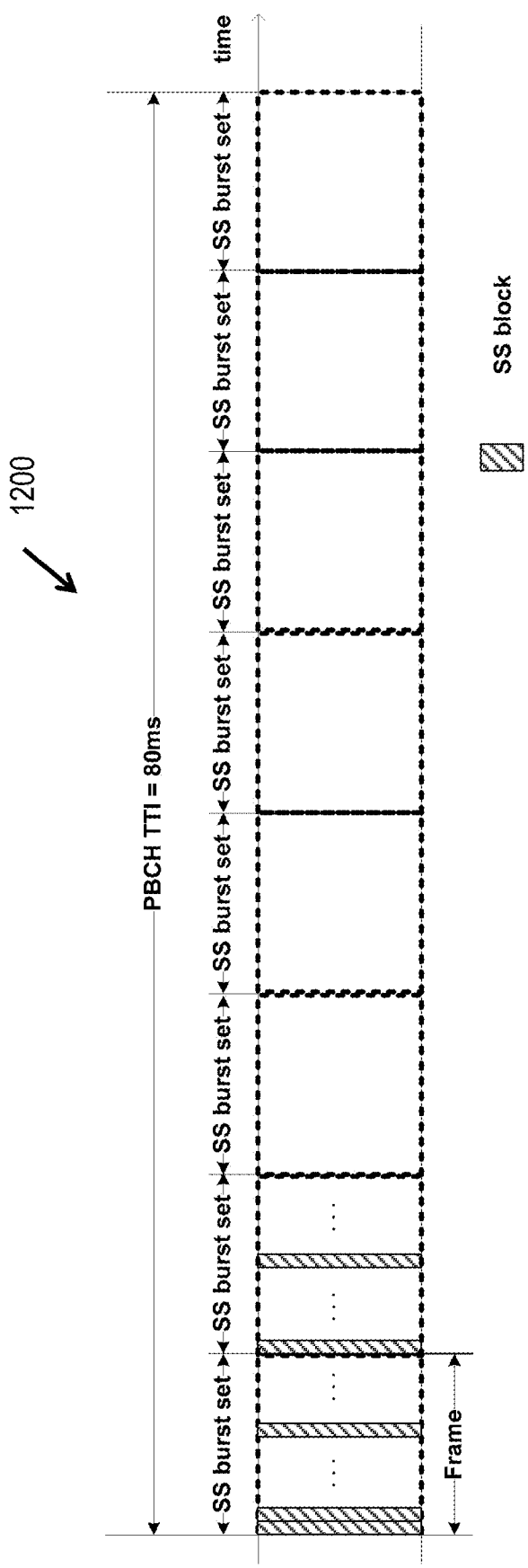
FIG. 12 shows an example of an SS burst set.

Specifically, as shown in the timeline 1200 in FIG. 12, in some embodiments, the SS burst set may have the duration of 10 msec. The system frame number of the SS block is 1110000010. The SFN indication field of the PBCH information bit in the SS block indicates an explicit indication 7 most significant bits, i.e. 1110000, where the PBCH of all SS blocks within the PBCH TTI contains the same explicit information; Further, the lower 3 bits are indicated by the redundant version (RV) of the PBCH, define the 8 different RVs of PBCH, each SS burst set corresponds to one RV. For example the 3 LSBs "010" correspond to a specific RV. In the SS block correspond to 3 LSBs "010", the base station uses the specific RV to transmit the corresponding PBCH. The terminal determines the lower 3 bits of the SFN by identifying the PBCH RV.

Figure 13:
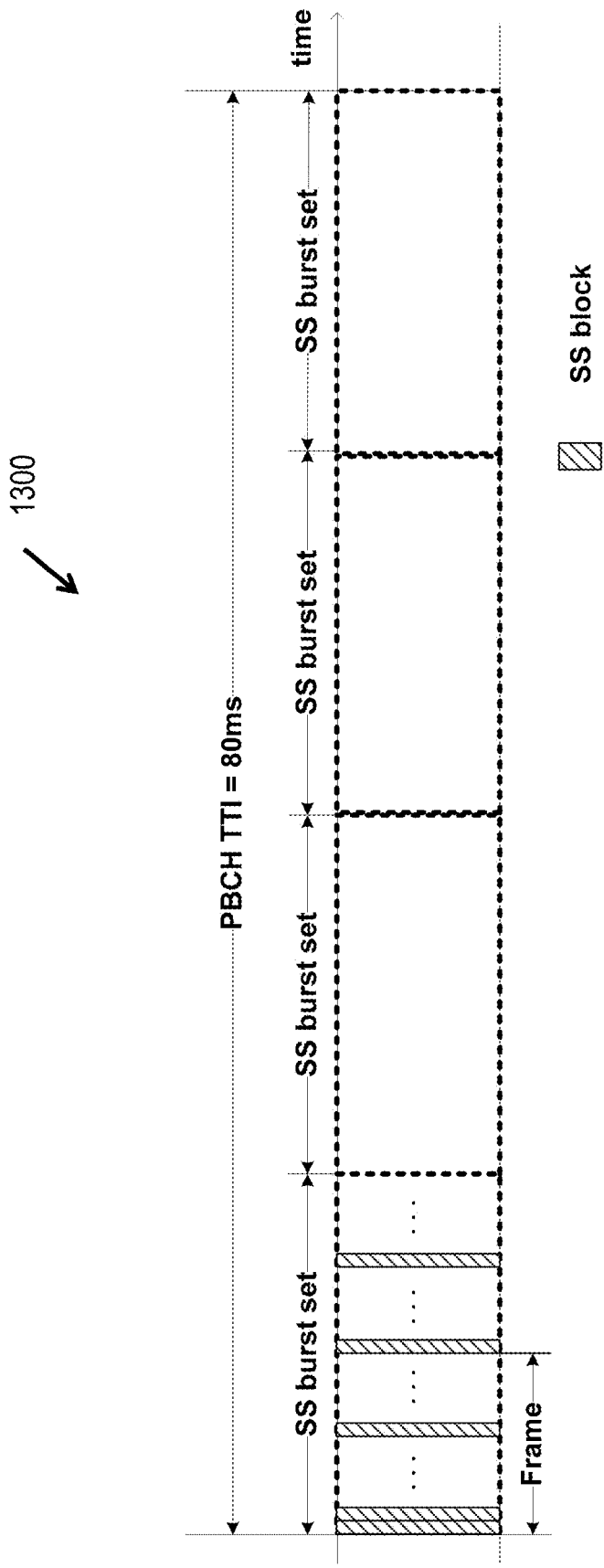
FIG. 13 shows an example of an SS burst set with 20 msec periodicity within 80 ms PBCH TTI.

For periodicity of SS burst set longer than the length of radio frame (e.g., 20 ms, 40 ms), as shown in the timeline 1300 in FIG. 13, which shows 20 ms periodicity of SS burst set as an example, there are two radio frames located in each duration of SS burst set. In such a case, the index/indication of SS burst set by itself cannot give the whole 3 LSB bits of the SFN. However, the index of SS block within the SS burst set can be further used for distinguishing the first of the second radio frame in the SS burst set. Similar to the description above, the index/indication of SS burst set within PBCH TTI can be indicated by different RVs or scrambling codes or Cyclic Redundancy Check (CRC) masks of PBCH implicitly. This way, the index of SS block can be obtained by receiving signals before decoding the PBCH.

Specifically, in one example embodiment, the system frame number SFN of the radio frame described by one SS block is 1110000010 in the case of a 20 ms SS burst set cycle. In this case, the SFN indication field of the PBCH information bit in the SS block indicates an explicit indication 7 most significant bits, i.e. 1110000, where the PBCH of all SS blocks within the PBCH TTI contains the same explicit information; further, the lower 3 bits of the SFN are indicated by the redundant version of the PBCH and the SS block index within the SS burst set. Each SS burst set corresponds to one RV, that is, the first two bits of the three bits of the SFN correspond to the RV of a unique PBCH. For example, "010" and "011" correspond to the same PBCH RV ("01"). In this case, the SS block index within the SS burst set can further distinguish the least significant bit is 0 or 1, using the predefined mapping relationship between SS block index and the least significant bit of the SFN as follows, the SS burst set contains 16 SS blocks, and the first eight SS blocks (SS block 0-7) are located in the previous radio frame of the SS burst set. The other 8 SS blocks (SS block 8-15) are located in the subsequent radio frame of the SS burst set. Then, it is predefined that SS block 0-7 correspond to the least significant bit is 0, SS block 8-15 correspond to the least significant bit of 1 bit is 1. The base station uses the RV determined above to transmit the corresponding PBCH. The terminal determines the lower 3 bits of the SFN by identifying the PBCH RV and the SS block index.

Figure 14:
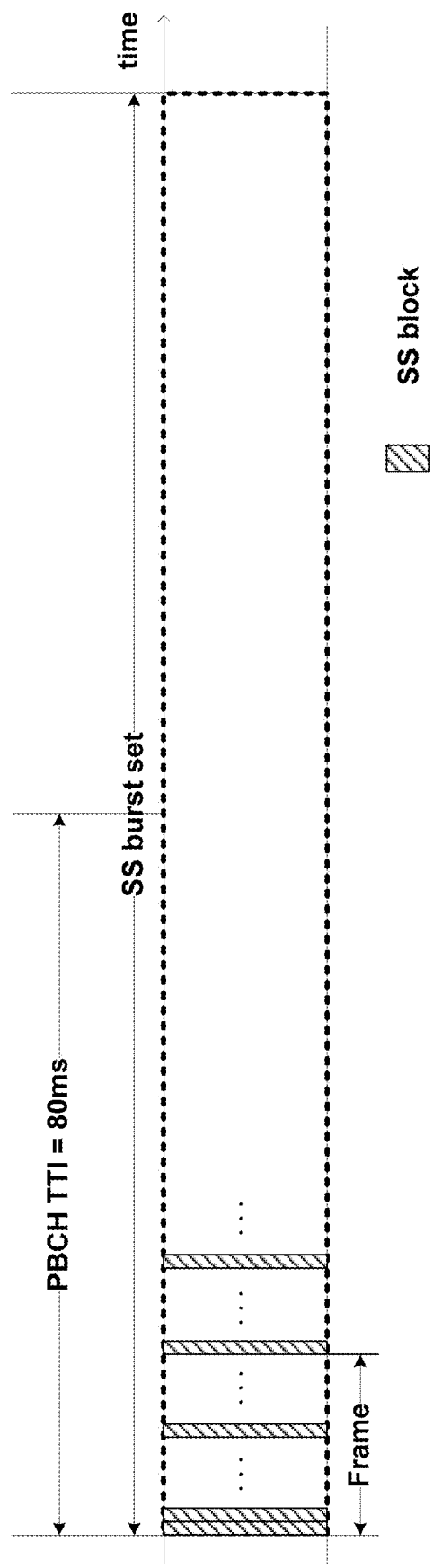
FIG. 14 shows an example of an SS burst set with 160 msec periodicity and 80 msec PBCH TTI.

For periodicity of SS burst set no shorter than the PBCH TTI (i.e. 80 ms, 160 ms). As shown in FIG. 14, there are two PBCH TTI located in duration of SS burst set. PBCH content will be changed within one SS burst set when SS blocks belong to different PBCH TTI. At least, PBCHs located in different (N−3) MSBs of the total N bits SFN.

Further, index/indication of SS burst set will lose its meaning for distinguishing different radio frames within the PBCH TTI because SS blocks within the PBCH TTI come from the same SS burst set. But SS block may locate in different radio frames. Index of SS block within the SS burst set can be used for radio frame distinguishing.

The 3 LSB bits of SFN can be indicated implicitly by SS block index within SS burst set, and/or index/indication of SS burst set within PBCH TTI. For 5 ms/10 ms periodicity of SS burst set, the 3 LSB bits of SFN can be indicated implicitly by index/indication of SS burst set within PBCH TTI. For 20 ms/40 ms periodicity of SS burst set, the 3 LSB bits of SFN can be indicated implicitly by SS block index within SS burst set, and index/indication of SS burst set within PBCH TTI. For 80 ms/160 ms periodicity of SS burst set, the 3 LSB bits of SFN can be indicated implicitly by SS block index within SS burst set. In these implementations, index/indication of SS burst set within PBCH TTI can be indicated by different RVs or Scrambling codes or Cyclic Redundancy Check (CRC) masks of PBCH implicitly can also be considered.

FIG. 8 shows a flowchart for an example method 800 of wireless communications.

The method 800 includes, at 802, mapping timing information in a wireless communication network to a signal, wherein the timing information includes information related to a synchronization signal (SS) block index and the signal comprises a reference signal on a broadcast channel, and/or a synchronization signal.

The method 800 includes, at 804, transmitting the signal to include at least a part of the information related to the SS block index.

In some embodiments, the synchronization signal sequence or the synchronization signal scrambling information may be used for indicating the SS block index information.

In some embodiments, a broadcast channel transmission mode may be used for indicting the SS block index information. For example, the transmission mode may be information bits carried by the broadcast channel, a cyclic shift of the broadcast channel information bits, scrambling of the broadcast channel, or cyclic redundancy check mask of the broadcast channel.

Figure 9:
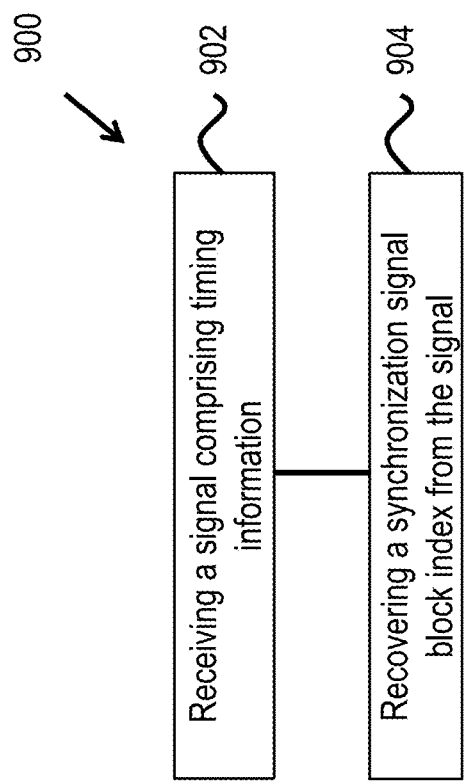
FIG. 9 is a flowchart of an example of another wireless communication method.

FIG. 9 is a flowchart of an example of another wireless communication method 900. The method 900 may be implemented by a user device (e.g., user device 1106).

The method 900 includes, at 902, receiving, by a receiving device, a signal comprising a mapping of timing information in a wireless communication network, wherein the timing information includes information related to a synchronization signal (SS) block index and the signal comprises a reference signal on a broadcast channel, and/or a synchronization signal.

The method 900 includes, at 904, recovering the SS block index from at least a part of the signal. The method 900 may further include recovering SS block index information from the signal, where the information is indicated using one of the techniques described herein.

Figure 10:
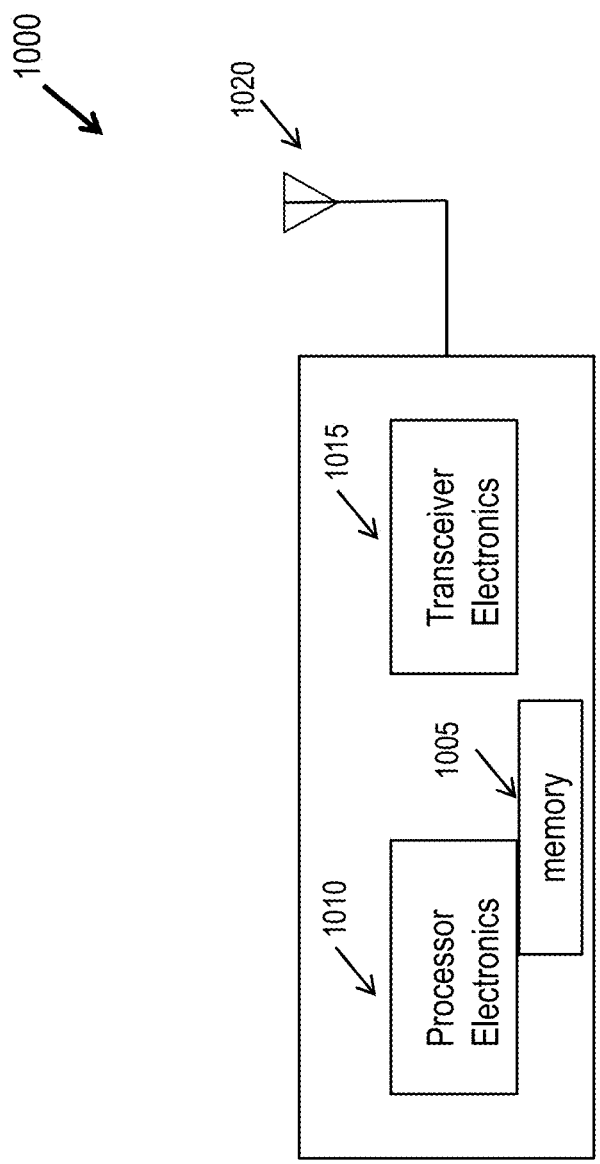
FIG. 10 is a block diagram of an example of a wireless communication apparatus.

FIG. 10 is a block diagram of an example of a wireless communication apparatus 1000. The apparatus 1000 includes a processor 1010 that may be configured to implement one of the techniques described herein, transceiver electronics 1015 that is able to transmit signals or receive signals using the antenna(s) 1020, and one or more memories 1005 that may be used to store instructions executable by the processor 1010 and/or data storage.

Figure 11:
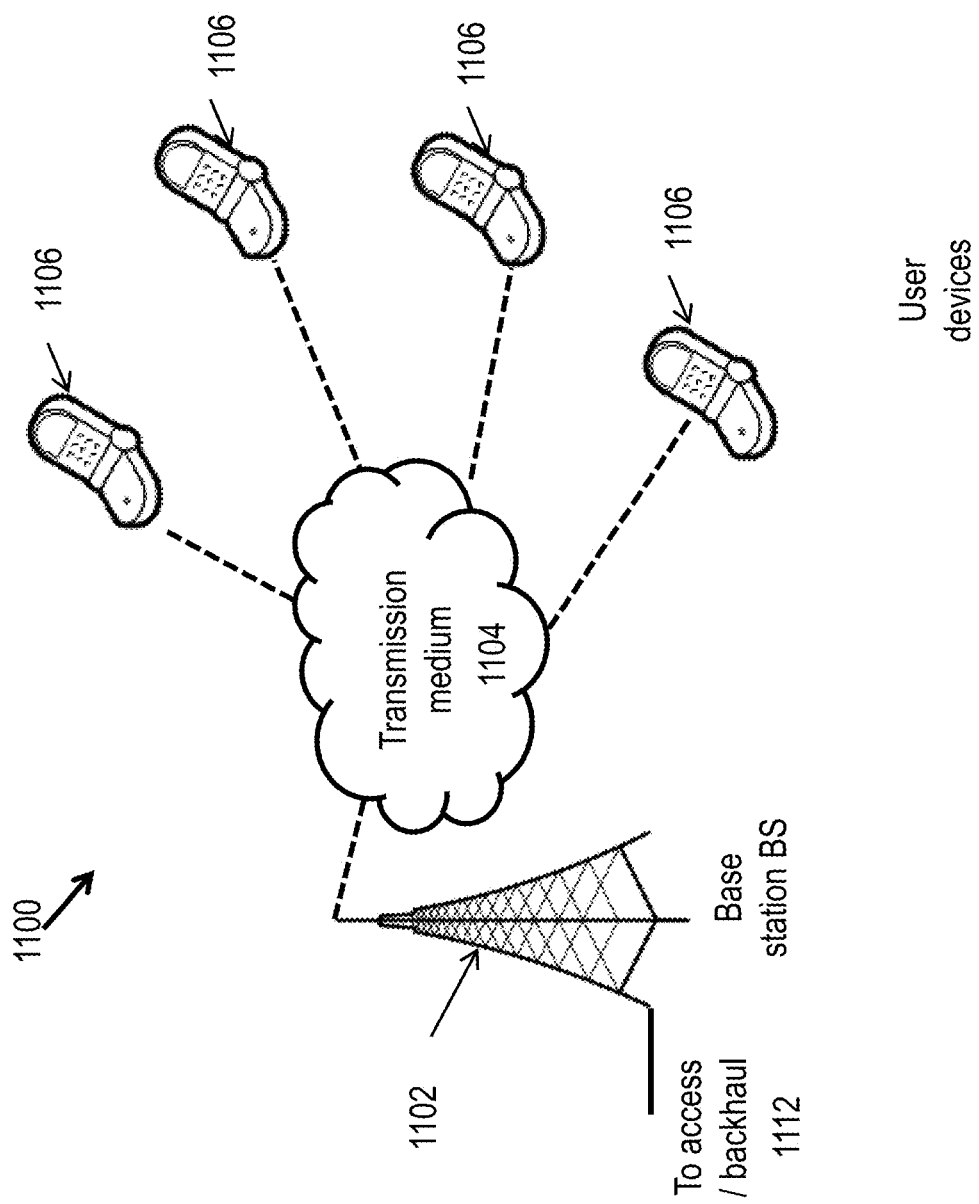
FIG. 11 shows an example wireless communications network.

FIG. 11 shows an example wireless communications network 1100. The network 1100 includes a base station BS 1102 and multiple user devices 1106 being able to communicate with each other over a transmission medium 1104. The transmissions from the BS 1102 to the devices 1106 are generally called downlink or downstream transmissions. The transmissions from the devices 1106 to the BS 1102 are generally called uplink or upstream transmissions. The transmission medium 1104 typically is wireless (air) medium. The BS 1102 may also be communicatively coupled with other base stations or other equipment in the network via a backhaul or an access network connection 1112.

It will be appreciated that technique that provide a method for transmitting timed information, which can be used to indicate the SS block index information by a combination of multiple instructions are disclosed. It can effectively reduce the blind check overhead caused by the implicit indication of PBCH and effectively reduce the capacity of the single instruction mode Demand, and by defining different for different cells.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   mapping, by a base station, timing information in a wireless communication network to a reference signal on a broadcast channel, wherein the timing information includes information related to a synchronization signal block index; and
   transmitting, by the base station, the reference signal to a terminal device, wherein the reference signal includes at least a part of the information related to the synchronization signal block index, and wherein the synchronization signal index is indicated by a combination of the reference signal and information bits carried by the broadcast channel.

2. The method of claim 1, wherein the information related to the synchronization signal block index includes N least significant bits of the synchronization signal block index, where N is a non-negative integer.

3. The method of claim 1, wherein the reference signal comprises a demodulation reference signal.

4. The method of claim 3, further comprising:
   indicating the information related to the synchronization signal block index based on a demodulation reference signal sequence.

5. A method for wireless communications, comprising:
   receiving, by a terminal device, a reference signal on a broadcast channel, the reference signal comprising a mapping of timing information in a wireless communication network, wherein the timing information includes information related to a synchronization signal block index; and recovering the synchronization signal block index from a combination of the reference signal and information bits carried by the broadcast channel.

6. The method of claim 5, wherein the information related to the synchronization signal block index includes N least significant bits of the synchronization signal block index, where N is a non-negative integer.

7. The method of claim 5, wherein the reference signal comprises a demodulation reference signal.

8. The method of claim 7, further including:

recovering the information related to the synchronization signal block index based on a demodulation reference signal sequence.

9. An apparatus comprising:

a processor; and a memory including processor-executable instructions stored thereon, the processor-executable instructions upon execution by the processor configures the processor to:

map timing information in a wireless communication network to a reference signal on a broadcast channel, wherein the timing information includes information related to a synchronization signal block index, and transmit the reference signal to a terminal device, wherein the reference signal includes at least a part of the information related to the synchronization signal block index, and wherein the synchronization signal index is indicated by a combination of the reference signal and information bits carried by the broadcast channel.

10. The apparatus of claim 9, wherein the information related to the synchronization signal block index includes N least significant bits of the synchronization signal block index, where N is a non-negative integer.

11. The apparatus of claim 9, wherein the reference signal comprises a demodulation reference signal.

12. The apparatus of claim 11, wherein the processor is configured to indicate the information related to the synchronization signal block index based on a demodulation reference signal sequence.

13. An apparatus comprising:

a processor; and a memory including processor-executable instructions stored thereon, the processor-executable instructions upon execution by the processor configures the processor to:

receive a reference signal on a broadcast channel, the reference signal comprising a mapping of timing information in a wireless communication network, wherein the timing information includes information related to a synchronization signal block index, and recover the synchronization signal block index from a combination of the reference signal and information bits carried by the broadcast channel.

14. The apparatus of claim 13, wherein the information related to the synchronization signal block index includes N least significant bits of the synchronization signal block index, where N is a non-negative integer.

15. The apparatus of claim 13, wherein the reference signal comprises a demodulation reference signal.

16. The apparatus of claim 15, wherein the processor is configured to recover the information related to the synchronization signal block index based on a demodulation reference signal sequence.

* * * * *

UNITED STATES PATENT AND TRADEMARK OFFICE
CERTIFICATE OF CORRECTION

PATENT NO.           : 10,652,064 B2                                           Page 1 of 1
APPLICATION NO.      : 16/168820
DATED                : May 12, 2020
INVENTOR(S)          : Xing Liu et al.

It is certified that error appears in the above-identified patent and that said Letters Patent is hereby corrected as shown below:

In the Claims

In Column 28, Line 52, in Claim 1, delete "signal index" and insert -- signal block index --, therefor.

In Column 29, Line 31, in Claim 9, delete "signal index" and insert -- signal block index --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*